United States Patent
Ukai et al.

(10) Patent No.: US 6,993,638 B2
(45) Date of Patent: Jan. 31, 2006

(54) MEMORY ACCESS DEVICE AND METHOD USING ADDRESS TRANSLATION HISTORY TABLE

(75) Inventors: Masaki Ukai, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 10/163,573

(22) Filed: Jun. 7, 2002

(65) Prior Publication Data

US 2002/0184430 A1   Dec. 5, 2002

Related U.S. Application Data

(63) Continuation of application No. PCT/JP99/06910, filed on Dec. 9, 1999.

(51) Int. Cl.
*G06F 12/00* (2006.01)
(52) U.S. Cl. ............... 711/210; 711/204; 711/205; 711/313
(58) Field of Classification Search ............... 711/213, 711/204, 205, 3, 210; 712/215
See application file for complete search history.

(56) References Cited

U.S. PATENT DOCUMENTS

| | | | | |
|---|---|---|---|---|
| 5,148,538 A | * | 9/1992 | Celtruda et al. | 711/205 |
| 5,377,336 A | * | 12/1994 | Eickemeyer et al. | 712/207 |
| 5,381,533 A | * | 1/1995 | Peleg et al. | 712/215 |
| 5,392,410 A | | 2/1995 | Liu | |
| 5,418,922 A | * | 5/1995 | Liu | 711/3 |
| 6,138,215 A | * | 10/2000 | Check et al. | 711/137 |
| 6,138,223 A | * | 10/2000 | Check et al. | 711/204 |
| 6,173,392 B1 | * | 1/2001 | Shinozaki | 712/207 |

FOREIGN PATENT DOCUMENTS

| | | |
|---|---|---|
| JP | A-59-056278 | 3/1984 |
| JP | A-59-075482 | 4/1984 |
| JP | A-59-172044 | 9/1984 |
| JP | A-02-024718 | 1/1990 |
| JP | A-04-277846 | 10/1992 |
| JP | A-06-19793 | 1/1994 |
| JP | A-07-036693 | 2/1995 |
| JP | A-07-191911 | 7/1995 |

OTHER PUBLICATIONS

Japanese Patent Office, Abstract JP-A-07-191911, Jul. 28,1995.
Japanese Patent Office, Abstract JP-A-02-024718, Jan. 26, 1990.
International Preliminary Examination Report International Application No. PCT/JP99/06910.

* cited by examiner

*Primary Examiner*—Kevin Verbrugge
(74) *Attorney, Agent, or Firm*—Staas & Halsey LLP

(57) ABSTRACT

If a base register value, an index register value and a displacement value are given in the case of operand access, these values are inputted to an arithmetic unit to generate a correctly calculated logical address. Simultaneously, a logical address predicting unit predicts a logical address. An absolute address is predicted based on the predicted logical address by using an absolute address history table. Access to a cache memory (LBS) based on an absolute address is made using the predicted absolute address to obtain cache data. Then, the arithmetic unit calculates a correct absolute address using the correctly calculated address using a TLB and checks if the correct absolute address coincides with the predicted absolute address so as to perform result confirmation of the cache data read from the LBS. In the case of instruction fetch, similar processing is carried out except that the calculation of a logical address is not performed.

18 Claims, 26 Drawing Sheets

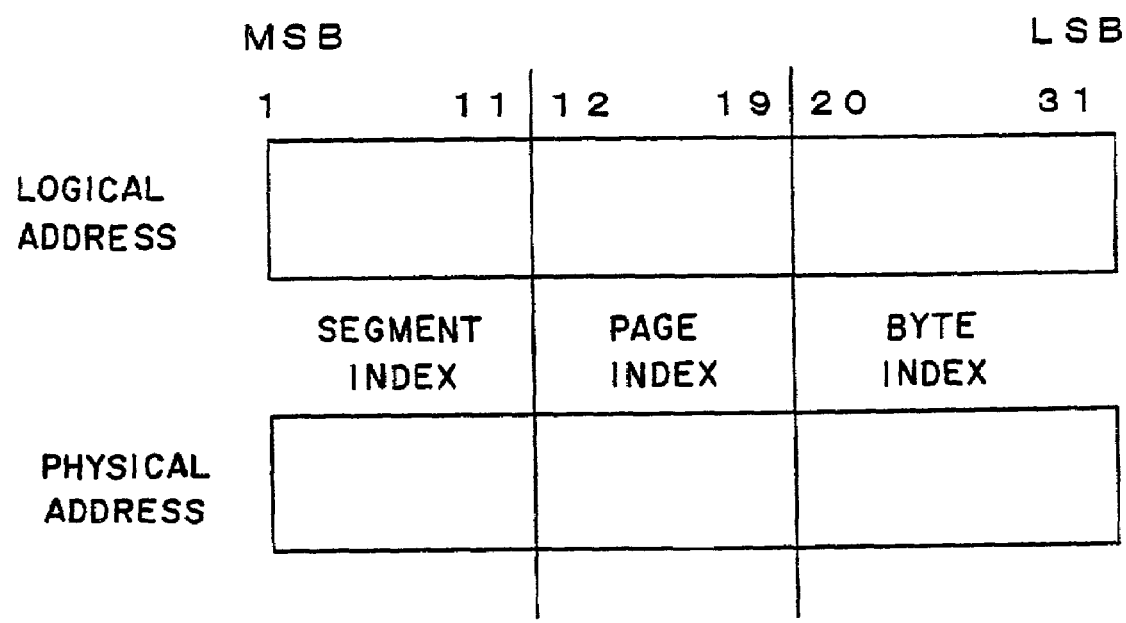
F I G. 1

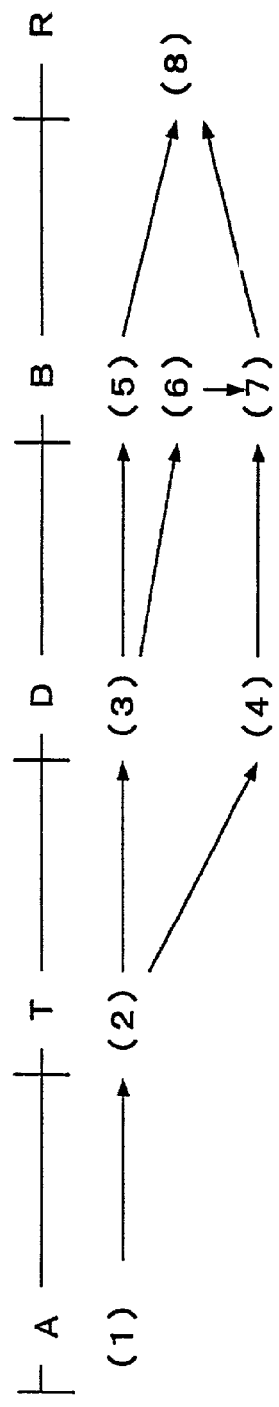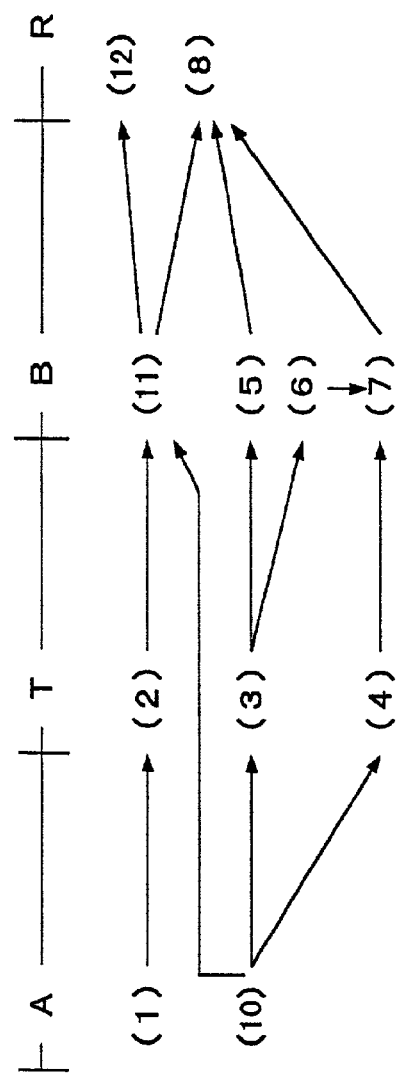
FIG. 4A
FIG. 4B

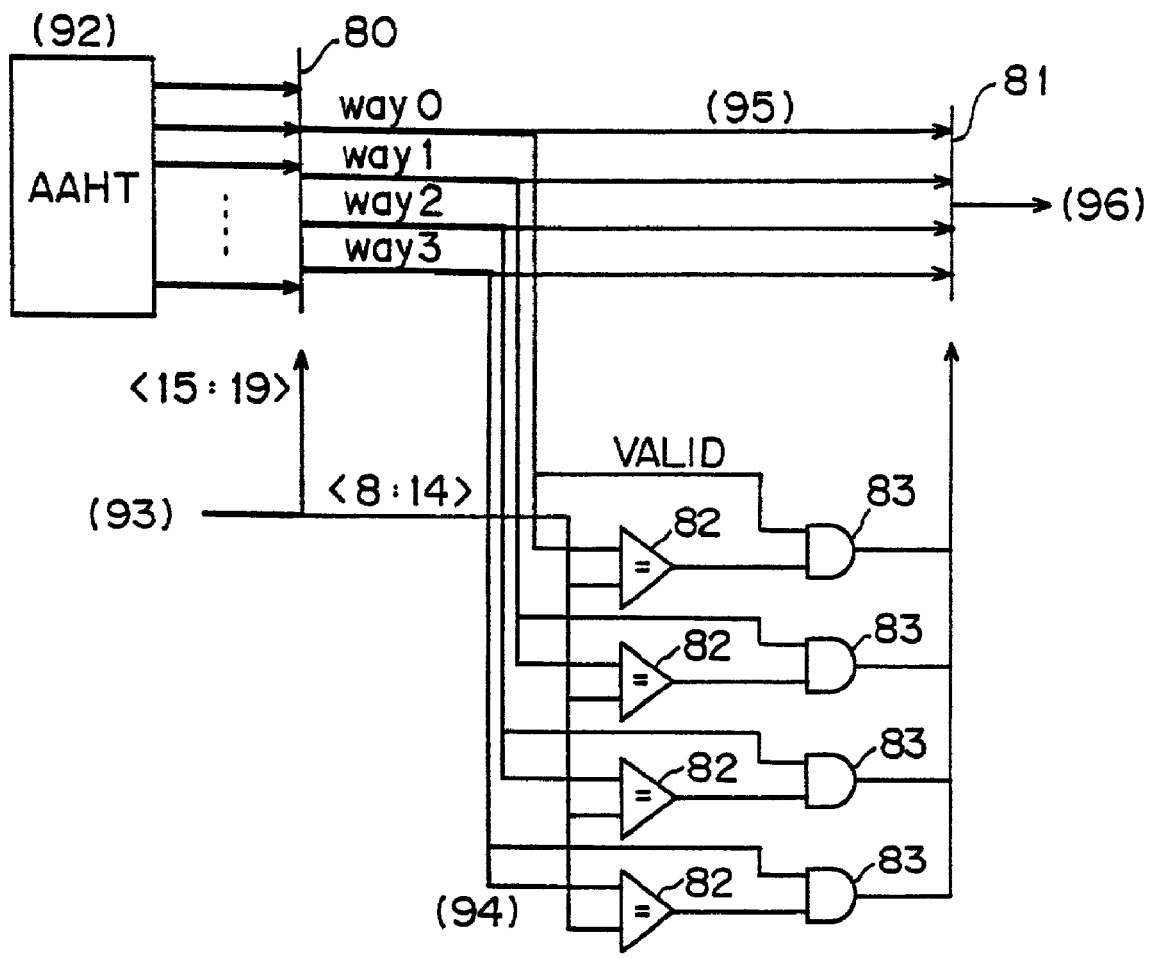
F I G. 13

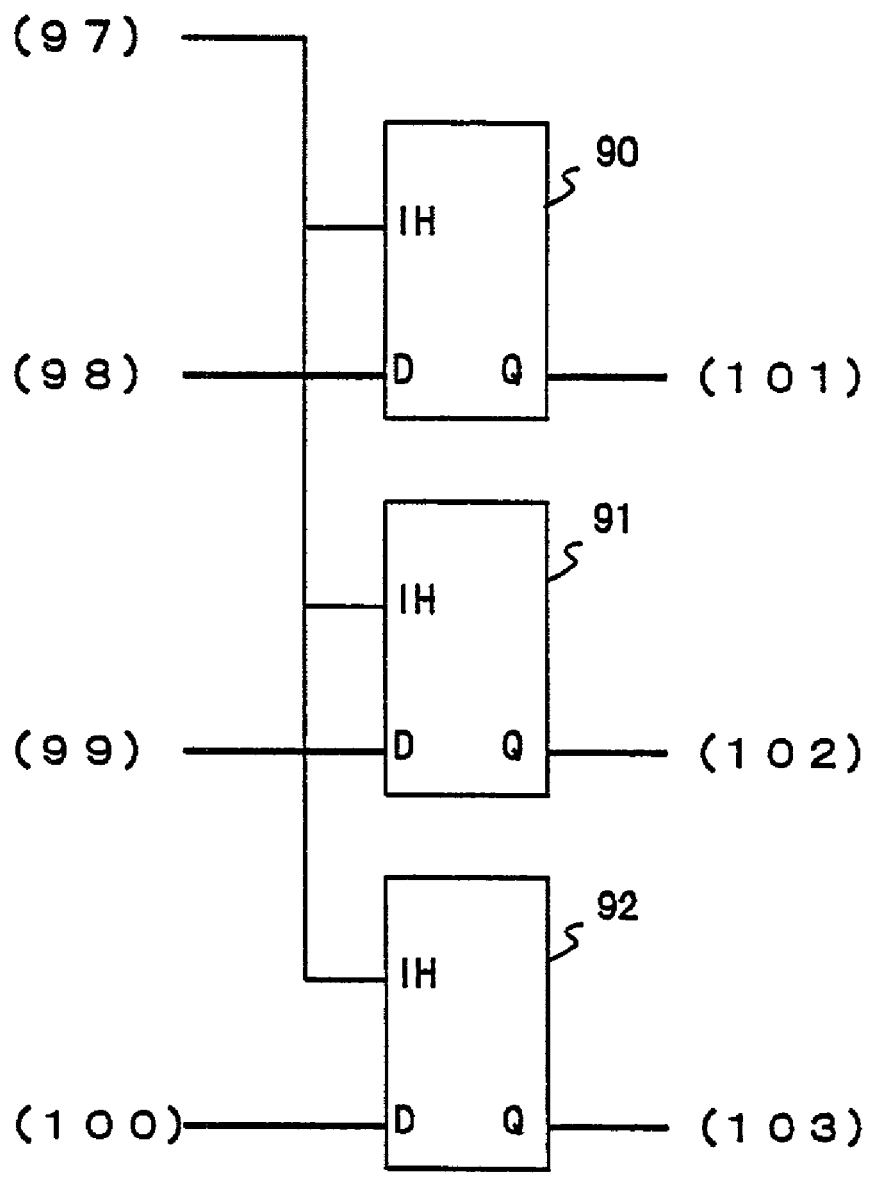
F I G. 14

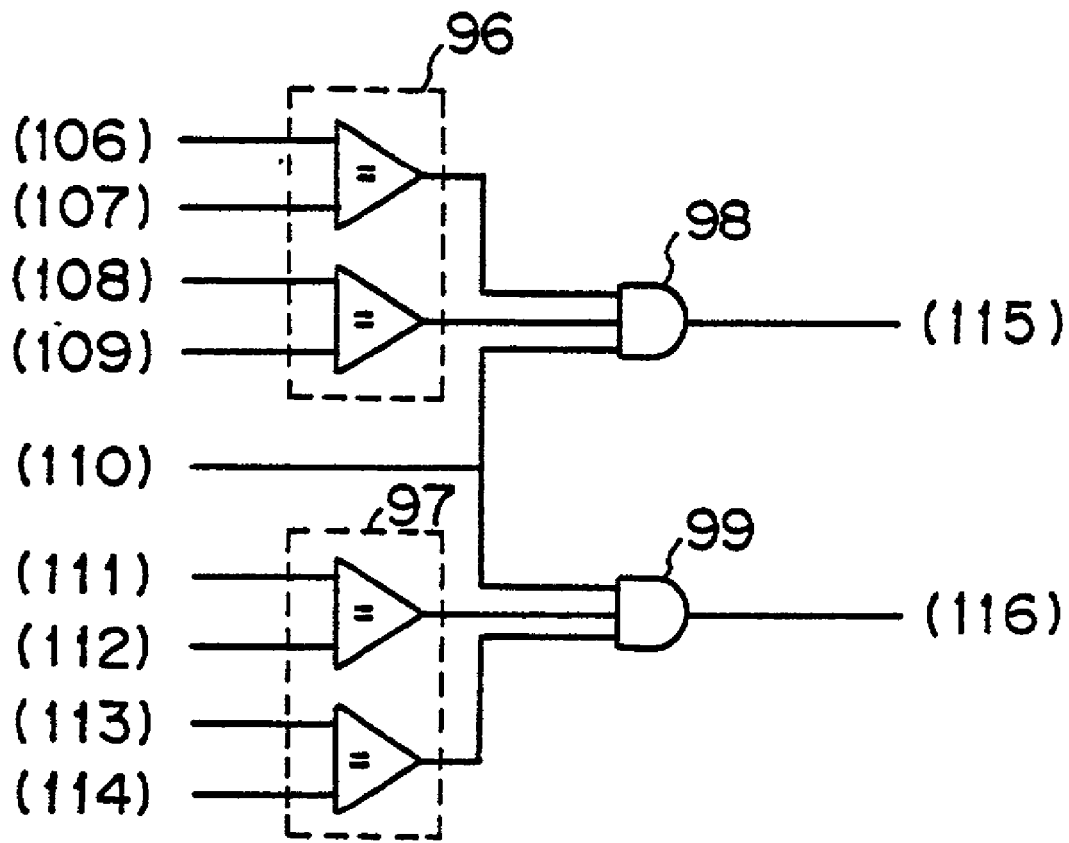
F I G. 16

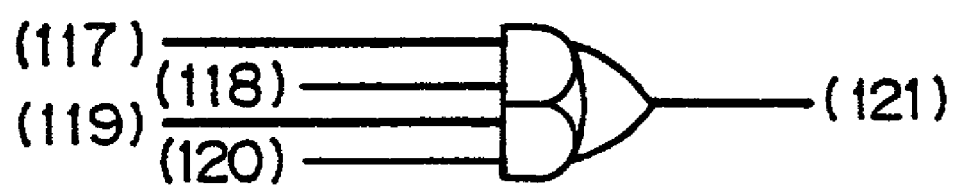
F I G. 17

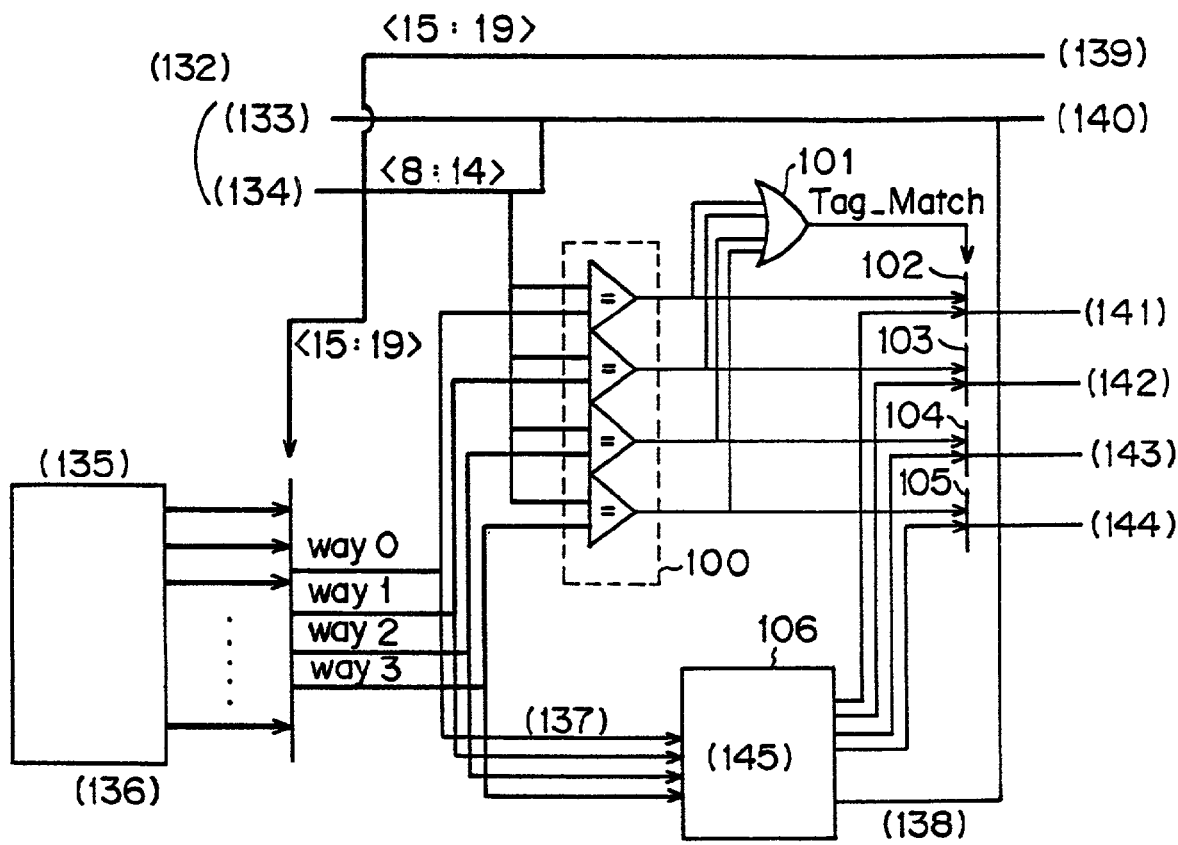
F I G. 21

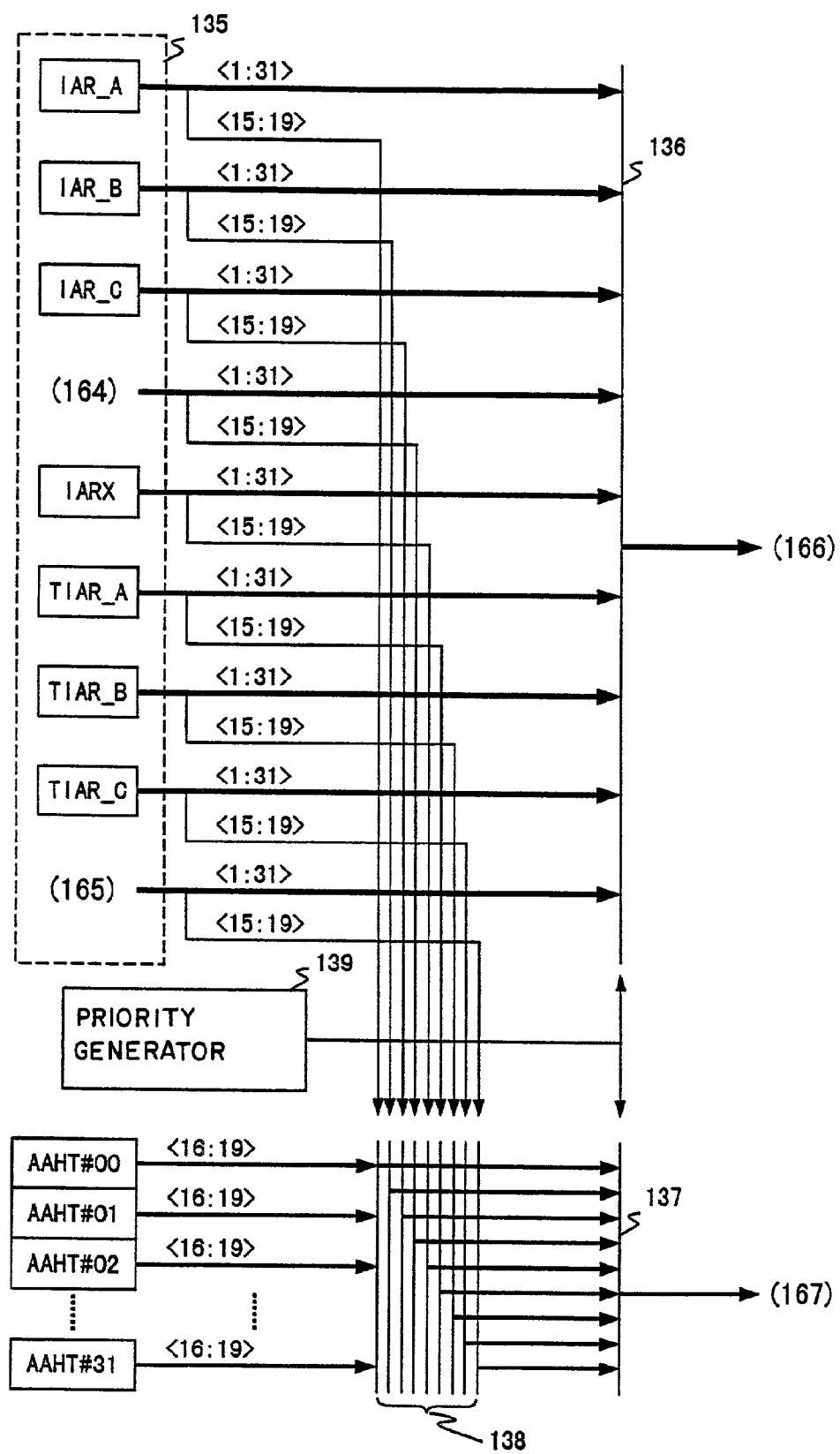
F I G. 25

MEMORY ACCESS DEVICE AND METHOD USING ADDRESS TRANSLATION HISTORY TABLE

CROSS REFERENCE

This application is a continuous application based on an international application number PCT/JP99/06910, filed on Dec. 9, 1999.

BACKGROUND OF THE INVENTION

1. Field of the Invention

The present invention relates to both a device and a method for accessing a cache memory based on a real address according to the memory access instruction of a virtual address (logical address) in an information processing apparatus with a logical address designation.

2. Description of the Related Art

In a cache memory system based on a logical address (or called "virtual address"), if there is a synonym problem, specifically, if a plurality of logical addresses point to the same real address, the same memory content must always be maintained in a location corresponding to each logical address in the cache memory, which is a troublesome problem in cache memory management.

When a cache memory system based on a real address (absolute address) is organized, time delay in the translation from a logical address to a real address becomes a problem.

Therefore, there is a solution in which a previous translation history from logical addresses to real addresses, called an "absolute address history table" is stored and by retrieving data from this table, the time delay is reduced.

According to this solution, in the case of operand access, the cache memory is retrieved based on a logical address obtained by adding a register value and a displacement value (in one case, the total of a plurality of register values and a displacement value, in another case, only a register value and in another case, only an immediate value (displacement value)). In this case, which register should be used, the displacement value (immediate value) and the like can be judged when an instruction is decoded. Therefore, if a register value is already determined, sometimes the absolute address history table can be retrieved by calculating a logical address, with time allowance.

However, according to an instruction control method, such as a superscalar method, an out-of-order method or the like, the relevant instruction is executed before register modification by an instruction string that is executed prior to the relevant instruction for operand access is determined. In this case, for example, the register value is bypassed from an arithmetic unit or a cache memory instead of reading the register value from a register file, and the relevant instruction is tentatively executed.

Alternatively, if function improvement by a recent high-clock or short-latency request is aimed for, sometimes it takes too much time to calculate a logical address and then to retrieve data from the absolute address history table even if the register value is determined.

Therefore, in such a case, even if a register value or a displacement value that is used is known, retrieving data from the register, calculating a logical address by adding up the values and retrieving data from the absolute address history table based on a logical address causes great function loss due to time delay.

However, since there is a tendency that a displacement value is small in the calculation of an operand address, first, in an architecture with a virtual memory, instead of separately locating a series of logical addresses in a real memory for each byte, a specific block (usually a powered value of 2) of logical addresses are collectively located properly in an real memory (hereinafter the minimum unit of this bock is called a "page"). For example, as shown in FIG. 1, since the low-order byte index of 20 bits or more of a real address is the same as that of a logical address, both a higher-order segment index (1 bit to 11 bits) and a higher-order page index (12 bits to 19 bits) are translated into a real address.

Therefore, it is not a low-order bit, that is, a byte index value, but higher-order bits (segment index and page index values) that are needed for cache access. Therefore, for a retrieval address, not the calculated address, but the middle-order bit part of a register value, which is the basis of the calculation, is used.

As described above, a problem in retrieving data from the table based on a register is page cross (carry) caused when adding a displacement value to a register value. A logically adjacent page is not always located adjacently. If carry occurs and a logically adjacent page is retrieved, cache retrieval always fails. Therefore, a time delay results.

However, it takes too much time to retrieve data from the absolute address history table using a result obtained by accurately adding a register value and a displacement value, including a case with a bypass, which is a problem.

There are also a variety of kinds of instruction fetch requests on an instruction fetch side. It also takes to much time to determine which instruction fetch request is issued from these many requests, to select a corresponding logical address and to retrieve data from the absolute address history table, which is also a problem.

SUMMARY OF THE INVENTION

It is an object of the present invention to provide an access memory control device for reducing processing delay, and a method thereof.

The device of the present invention comprises an address history table storing in a pair at least a partial bit string of a logical address and bits needed as a retrieval key of a memory based on an absolute address, of an absolute address corresponding to the partial bit string of the logical address, a retrieval unit retrieving data from a register file in the case of memory access, reading a value corresponding to the register number of the register file and retrieving data from the address history table using the value as a logical address and using the partial aggregate of the logical address, a memory access unit accessing the memory using a predicted absolute address obtained by retrieving data from the address history table, an acquisition unit obtaining a correct absolute address from the logical address and a memory access result confirmation unit assuring the result of memory access made using the predicted absolute address, by checking the coincidence between the predicted absolute address and the correct absolute address.

The method of the present invention comprises (a) storing in a pair at least a partial bit string of a logical address and bits needed as a retrieval key of a memory based on an absolute address, of the absolute address corresponding to the partial bit string of the logical address; (b) retrieving data from a register file in the case of memory access, reading a value corresponding to the register number of the register file and retrieving data from the memory content stored in (a) using the value as a logical address and using the partial aggregate of the logical address; (c) accessing a memory using a predicted absolute address obtained in (b); (d)

obtaining a correct absolute address from the logical address; and (e) assuring the result of memory access made using the predicted absolute address, by detecting that the predicted absolute address and the correct absolute address are the same.

According to the present invention, the synonym problem can be solved using a memory to be accessed as an absolute address base. Furthermore, an absolute address used to access the memory is predicted from a register value and the memory is accessed while a logical address is calculated based on the register value, after an instruction is decoded. Whether the prediction succeeds or fails is judged by comparing the absolute address correctly obtained from the calculated logical address with the predicted absolute address. If the prediction succeeds, the process cycle is shortened, since the result of a memory access based on the predicted absolute address can be used without performing another process. If the prediction fails, the process is delayed since the memory is accessed using the correctly obtained absolute address. However, compared with the conventional memory access based on a logical address, higher-speed memory access can be implemented since there is no synonym problem.

BRIEF DESCRIPTION OF THE DRAWINGS

FIG. 1 shows one example configuration of both a logical address and a physical address;

FIGS. 4A and 4B show a conventional cache access cycle based on an absolute address in which absolute addresses are not calculated in parallel and the cache access cycle of the preferred embodiment of the present invention, respectively, for the purpose of comparison;

FIG. 13 shows a configuration for selecting the entry of an absolute address history table and outputting a predicted absolute address;

FIG. 14 shows one example configuration of a register-pair history based on a logical address;

FIG. 16 shows one example configuration of a register-pair/address history selector used when both a base register value and an index register are large;

FIG. 17 shows one example configuration of the real address output generator of a register-pair/absolute address history;

FIG. 21 shows one example configuration of a circuit for determining a writing way;

FIG. 25 shows the configuration of an instruction fetch unit; and

Figure 2A:
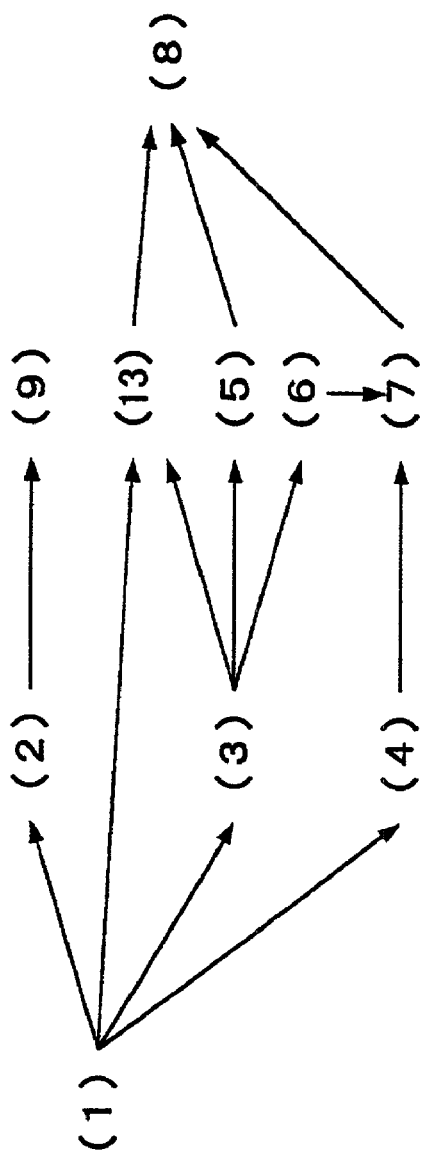
FIGS. 2A and 2B show a conventional cache access cycle based on a logical address and the cache access cycle based on an absolute address of the preferred embodiment of the present invention, respectively.

For descriptions of codes in parentheses in the drawings, see "Explanation of the Codes" attached at the end of the drawings.

DESCRIPTION OF THE PREFERRED EMBODIMENTS

The respective preferred embodiments of the instruction fetch and operand access of the present invention are described below.

In the case of operand access, the use of an absolute address table based on a register largely has the following problems.

Both a register value to be used for memory retrieval and a displacement value to be added usually vary depending on an instruction to request memory access.

Sometimes the immediately preceding instruction rewrites a register value to be used for memory retrieval. In that case, if the execution of the current instruction must be waited for until the register value is determined, a large time delay is incurred.

In a specific kind of architecture, a plurality of registers to be used for memory retrieval and a displacement value can be designated. In that case, a total value obtained by adding these values must be designated as a logical address to be used for memory retrieval.

When a register to be used for memory retrieval and a displacement value are added, sometimes the total value indicates a page different from that indicated by the original register value.

In order to solve these problems, some of the followings methods can be combined and used.

If no time delay problem occurs because of the hardware configuration of a processor, even when calculation is performed across pages, that is, when carry calculation is performed, the carry calculation is performed using both a logical address and all the bits of a displacement value.

In particular, if carry calculation is delayed, such as when bypassing is made in a state where a register value is not yet determined, partial carry calculation is performed using both a logical address and a part of a displacement value or carry prediction is performed using a carry history storing the previous carry history and the like. The accuracy is also improved as long as time delay permits.

If a plurality of registers are designated, the appropriate one is selected or another absolute address history table is retrieved. In particular, if two registers are designated, in many cases, one of them is located in a byte index corresponding range. In this case, it is efficient to select a register located out of the byte index.

Alternatively, all these methods can be combined and used. Alternatively, only especially efficient methods can be selected and used for the reasons of time loss, circuit cost and the like.

In particular, if a register value is used for memory retrieval and if an instruction string is locally viewed, there are only several specific registers that the instruction string can use for memory retrieval. If a displacement value or another register are further added, in most cases, only few registers cross pages.

However, in a specific application (for example, if the array index of an application for performing a vector operation is allocated to a register), sometimes both of two register values are large and they are used to indicate two logically separated pages. However, for example, in such an operation, the number of register pairs to be combined is fairly limited. In this case, if each of these pairs is registered in a separate absolute address history table, in many cases, the problems are successfully solved.

By reducing as much as possible the number of errors at the time of table retrieval by the combination of these methods, by comparing the result of the table retrieval with the results of TLB (Translation-Lookaside Buffer) retrieval, if an incorrect result (or invalid result) is outputted despite such an effort and by immediately performing cache retrieval again if it is found that the result of the table retrieval is incorrect and simultaneously writing back a correct result in the table, a cache system based on a real address without function degradation can be organized.

In the case of an instruction fetch, there is no complex logical address calculation, which is different from the operand access. However, since in the recent instruction fetch method, branch prediction, pre-fetch and the like are introduced, memory access is performed by selecting an appropriate request from both ordinary instruction fetch requests and these fetch requests.

Since in the recent architecture, this priority selection is complicated, a time delay problem occurs if an absolute address history table is also retrieved based on the complex selected result.

Therefore, since the address of each instruction fetch request is known in advance or can be calculated with small time loss, cache memory access based on a real address is performed by retrieving data from the absolute address history table in advance for each request and selecting the retrieval result of the absolute address history table in advance as in address selection by a selection signal.

In the following description of this preferred embodiment, it is assumed that the memory for one page is four kilobytes, in other words, the width of a byte index is 12 bits. It is also assumed that a logical address has a width of 31 bits.

It is assumed that there are 16 general-purpose registers and in the case of operand access of an instruction, a maximum of two registers (a base register and an index register) can be designated from these general-purpose registers depending on an instruction and that if a register No. 0 is designated in register designation, the register is not used. It is assumed that as a displacement value used together with these registers, an integral constant of 12 bits (0 to 4095) can be designated.

An instruction fetch unit is provided with three instruction fetch ports, and it is assumed that subsequent instruction fetch for each port, branch destination instruction fetch for branch prediction from each port, branch destination instruction fetch bypassed from a branch history, re-instruction fetch at the time of branch failure from a branch instruction processing mechanism and instruction fetch at the time of start, interruption and the like are requested.

FIG. 2 compares the cache access cycle based on an absolute address of the preferred embodiment of the present invention with the conventional cache access cycle based on a logical address.

Figure 2B:
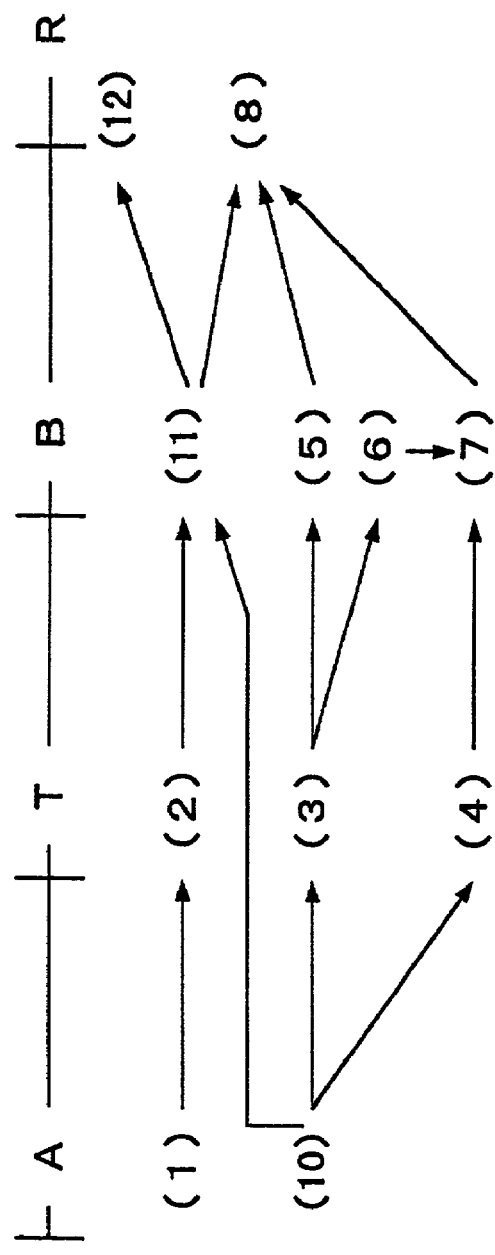

In either the instruction fetch case or operand access case, cache access is performed in the cycle shown in FIG. 2B. FIG. 2A shows an execution example in the conventional cache system based on a logical address for the purpose of comparison. In either case, if a cache failure, an address non-coincidence or the like occurs, result confirmation, which should occur in cycle R, is not performed and only an operation for returning correct data (for example, access to the second cache, etc.) is performed. However, since this operation is the same as that of the prior art, the description is omitted here.

In the case of the conventional cache access based on a logical address shown in FIG. 2A, first, in cycle A, a logical address to be fetched is generated. Then, in cycle T, an absolute address is calculated by retrieving data from a TLB using this logical address and simultaneously both the tag and data of an LBS (Local Buffer Storage: a cache memory) are read. Then, in cycle B, the absolute address obtained by retrieving data from the TLB is used for the second cache access and simultaneously the read LBS data are set in a buffer depending on the coincidence check between the logical address generated in cycle A and the logical address of the read LBS tag, exception check and way selection. Then, in cycle R, result confirmation is performed.

However, in the preferred embodiment of the present invention shown in FIG. 2B, in cycle A, a logical address to be fetched is generated and simultaneously an absolute address used to access a cache memory is predicted. Then, in cycle T, both an LBS tag and LBS data are read using the predicted absolute address. In parallel with these operations, in cycle T, a real absolute address is calculated by retrieving data from a TLB using the logical address. Then, in cycle B, exception check, way selection or setting of the LBS data in a buffer are conducted depending on the read results of the LBS tag and LBS data. Furthermore, in cycle B, the coincidence between the absolute address calculated by retrieving data from the TLB and the predicted absolute address is checked. Then, if in cycle R it is judged that as a result of the absolute address coincidence check that the prediction is correct, result confirmation is performed. If it is judged that the prediction is not correct, a correct address correspondence is written back in the absolute address history table (AAHT).

As is clearly seen when comparing FIG. 2A with FIG. 2B, by adopting this preferred embodiment, even in the case of a cache system based on an absolute address, there is no time loss compared with that based on a logical address. They differ only when the prediction of an absolute address fails. This difference is described later.

FIG. 3 compares the cache access cycle of the preferred embodiment of the present invention with a cache access cycle based on an absolute address in the conventional configuration in which absolute addresses are not calculated in parallel.

Figure 3A:
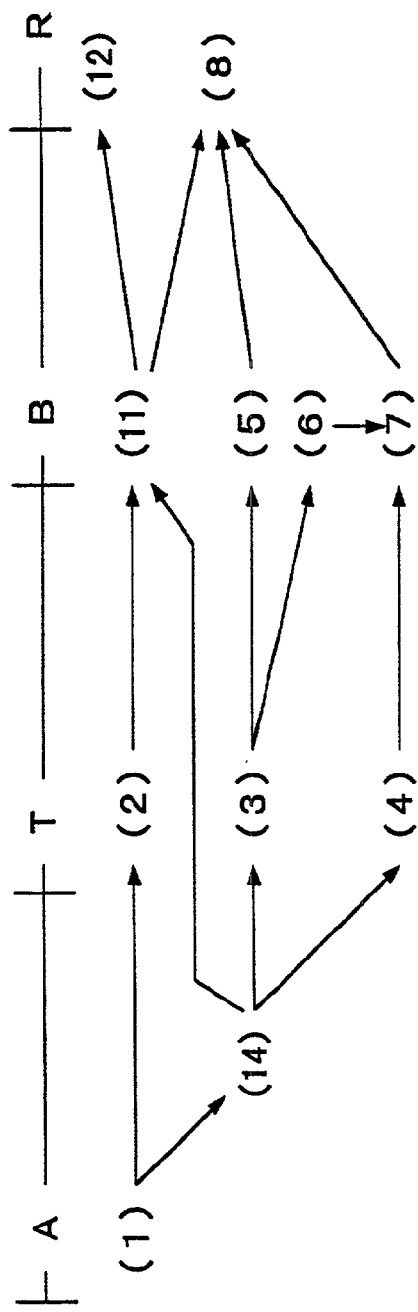
FIGS. 3A and 3B show a cache access cycle based on an absolute address, with a conventional configuration in which absolute addresses are not calculated in parallel and the cache access cycle of the preferred embodiment of the present invention, respectively.

FIG. 3A shows the conventional configuration. In this case, in cycle A, a logical address to be fetched is generated and simultaneously an absolute address is calculated by retrieving data from the absolute address history table (AAHT). In cycle T, another absolute address is calculated by retrieving data from a TLB using the generated logical address. Both the LBS tag and LBS data are read using the absolute address obtained by retrieving data from the AAHT. Then, in cycle B, the coincidence between the absolute address obtained in cycle A and the absolute address obtained in cycle T is checked and simultaneously both the exception check/method selection that are based on the LBS tag and the setting of the LBS data in a buffer are performed. Then, if in cycle R, as a result of the absolute address coincidence check, a coincidence is detected, result confirmation is performed. If it is judged that there is no coincidence, a correct address correspondence is written back in the AAHT.

Figure 3B:
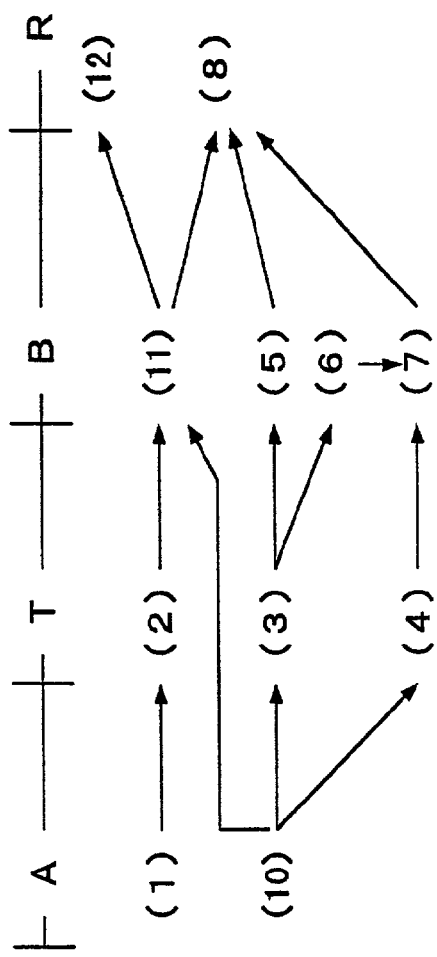

FIG. 3B shows the process cycle of this preferred embodiment shown in FIG. 2B. The detailed description is omitted here.

As is clearly seen when comparing FIGS. 3A and 3B, since in the case of FIG. 3A, the work amount in one cycle increases and as a result, intervals between cycles are prolonged and the process speed is reduced. In this way, by adopting this preferred embodiment, the process speed can be improved compared with the conventional cache mechanism based on an absolute address.

FIG. 4 compares this preferred embodiment with the conventional cache access based on an absolute address that does not calculate a plurality of absolute addresses in parallel.

FIG. 4A shows the prior art. As shown in FIG. 4A, first, in cycle A, a logical address to be fetched is generated, and in cycle T, an absolute address is calculated by retrieving data from a TLB. Then, in a newly provided cycle D, both the LBS tag and LBS data are read. Then, in cycle B, the exception check, the way selection, the setting of the LBS data in a buffer or the like is performed, and in cycle R, result confirmation is performed.

Since FIG. 4B shows the preferred embodiment described with reference to FIG. 2B, the description is omitted.

When comparing FIGS. 4A and 4B, the processing of FIG. 4A is delayed by one clock compared with that of the preferred embodiment, since FIG. 4A is provided with a new cycle D.

As described above, according to the cache access method based on an absolute address of the preferred embodiment, the process is performed at the same process speed as that of the conventional cache access based on a logical address and simultaneously the process is performed at a higher speed than that of the conventional cache access method based on an absolute address, which is an advantage. Furthermore, since this preferred embodiment adopts cache access based on an absolute address, there is no synonym problem, compared with cache access based on a logical address, which is another advantage. Although in the description given above, the conventional cache access based on a logical address and the preferred embodiment have the same process speed, the process speed of the preferred embodiment is higher than that of the cache access based on a logical address as a whole since in the case of cache access based on a logical address, there is process delay due to the synonym problem, which is another advantage.

It is assumed that in this preferred embodiment, a cache mechanism comprises a TLB, LBS_DATA and LBS_TAG. It is assumed that the TLB and LBS are composed of 512 and 1024 lines, respectively, and that one block of the LBS is 64 bytes. Then, in this configuration, the address bit of LBS access is <16:25>. Since this configuration adopts a cache based on an absolute address, in the case of <20:25>, an absolute address and a logical address are matched. Therefore, in the case of <20:25>, a logical address output is used. In the case of <16:19>, the predicted absolute address output of the preferred embodiment is used.

Simultaneously, TLB access is performed using a logical address partly in order to confirm the prediction. If the TLB is 512 lines, the logical address bit <11:19> is used. In other words, in the cache unit, the addresses outputted according to the preferred embodiment are used, as shown in FIG. 5.

Figure 5A:
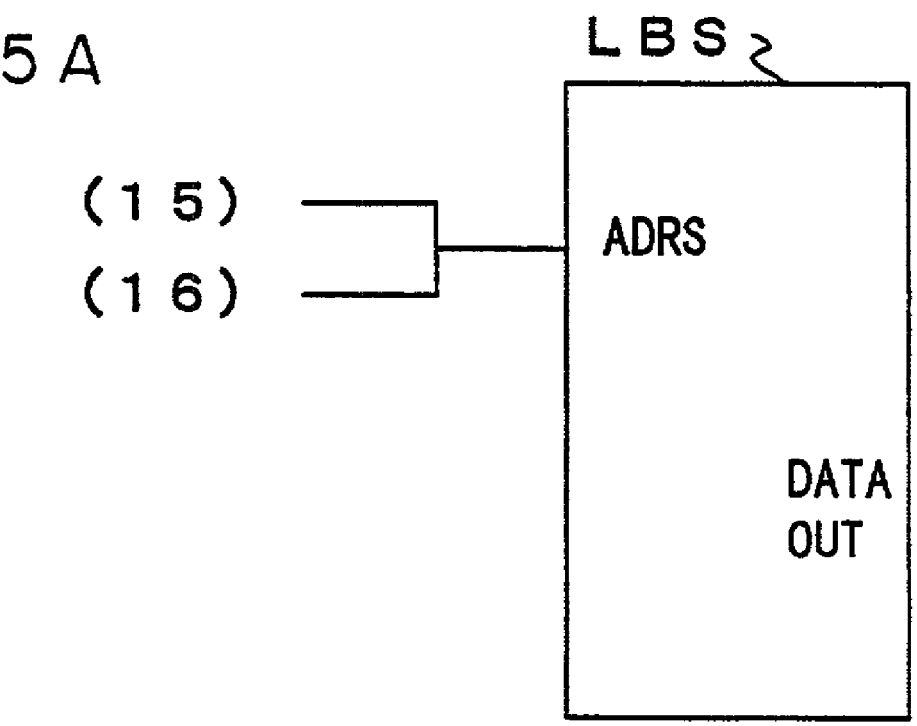
FIGS. 5A and 5B show address input to a cache memory and address input to a TLB, respectively.

Specifically, LBS_TAG (LBS tag) and LBS_DATA (LBS data) are stored in the LBS shown in FIG. 5A. As described above, to the address terminal ADRS of the LBS, both an absolute address ABS_ADRS<16:19> and a logical address LOGICAL_ADRS<20:25> are inputted, and from a data output terminal DATAOUT, a variety of cache contents are outputted.

Figure 5B:
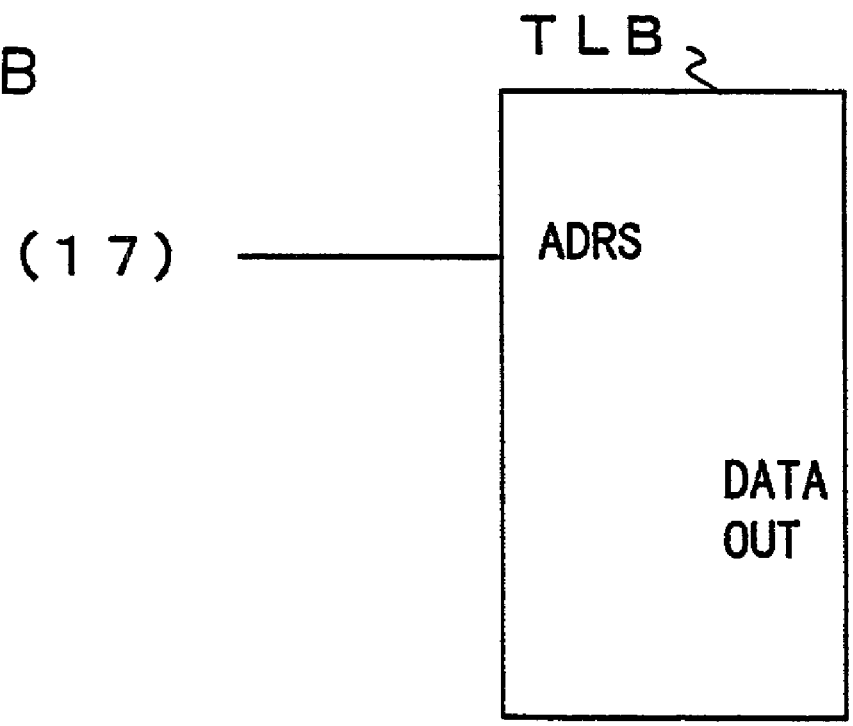

To the address terminal ADRS of the TLB shown in FIG. 5B, a logical address LOGICAL_ADRS<12:19> is inputted, and from the data output terminal DATAOUT, an absolute address corresponding to the logical address is outputted.

Figure 6:
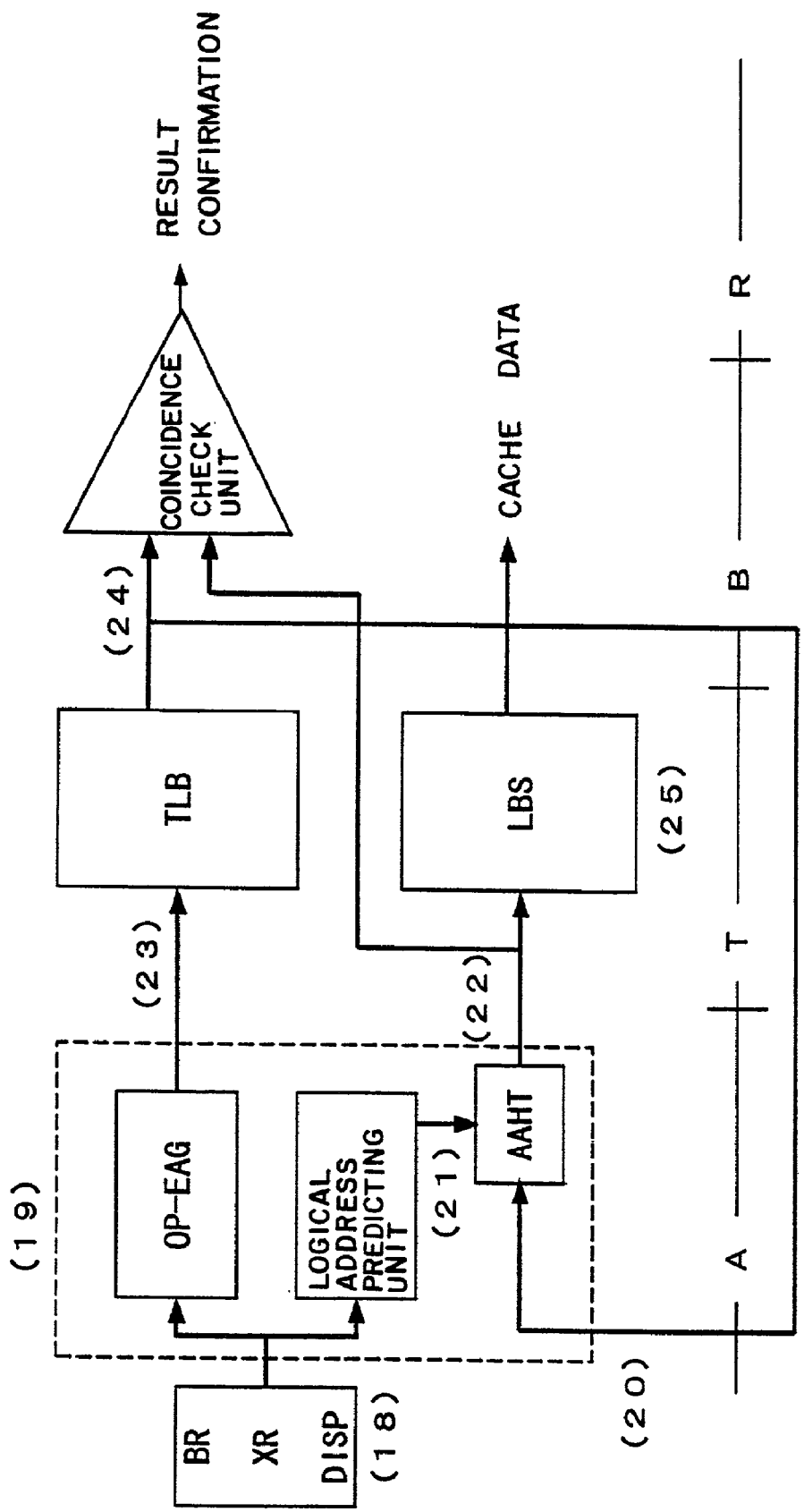
FIG. 6 shows the entire process flow of the preferred embodiment of the operand access unit of the present invention.

FIG. 6 shows the entire process flow of the preferred embodiment of the operand access unit of the present invention.

First, as the original data of address calculation, a base register value BR, an index register value XR and a displacement value DISP are inputted to an operand access unit. These pieces of data are used to calculate a logical address in an address arithmetic unit OP-EAG. The logical address outputted from the OP-EAG is a logical address that is correctly calculated. This correctly calculated logical address is inputted to the TLB and a corresponding absolute address is outputted.

The base register value BR, index register value XR and displacement value DISP are also inputted to a logical address predicting unit, and a predicted logical address is outputted. This predicted logical address is inputted to the absolute address history table AAHT, and a predicted absolute address is generated. The predicted absolute address is inputted to the LBS, which is a cache based on an absolute address, and cache data are outputted.

The predicted absolute address is inputted to a coincidence check unit together with the absolute address from the TLB, and a judgment result of whether the predicted absolute address coincides with the absolute address from the TLB is outputted as result confirmation. The absolute address outputted from the TLB is inputted to the absolute address history table AAHT, and the correspondence is written back as a correct correspondence between a logical address and an absolute address.

Figure 7:
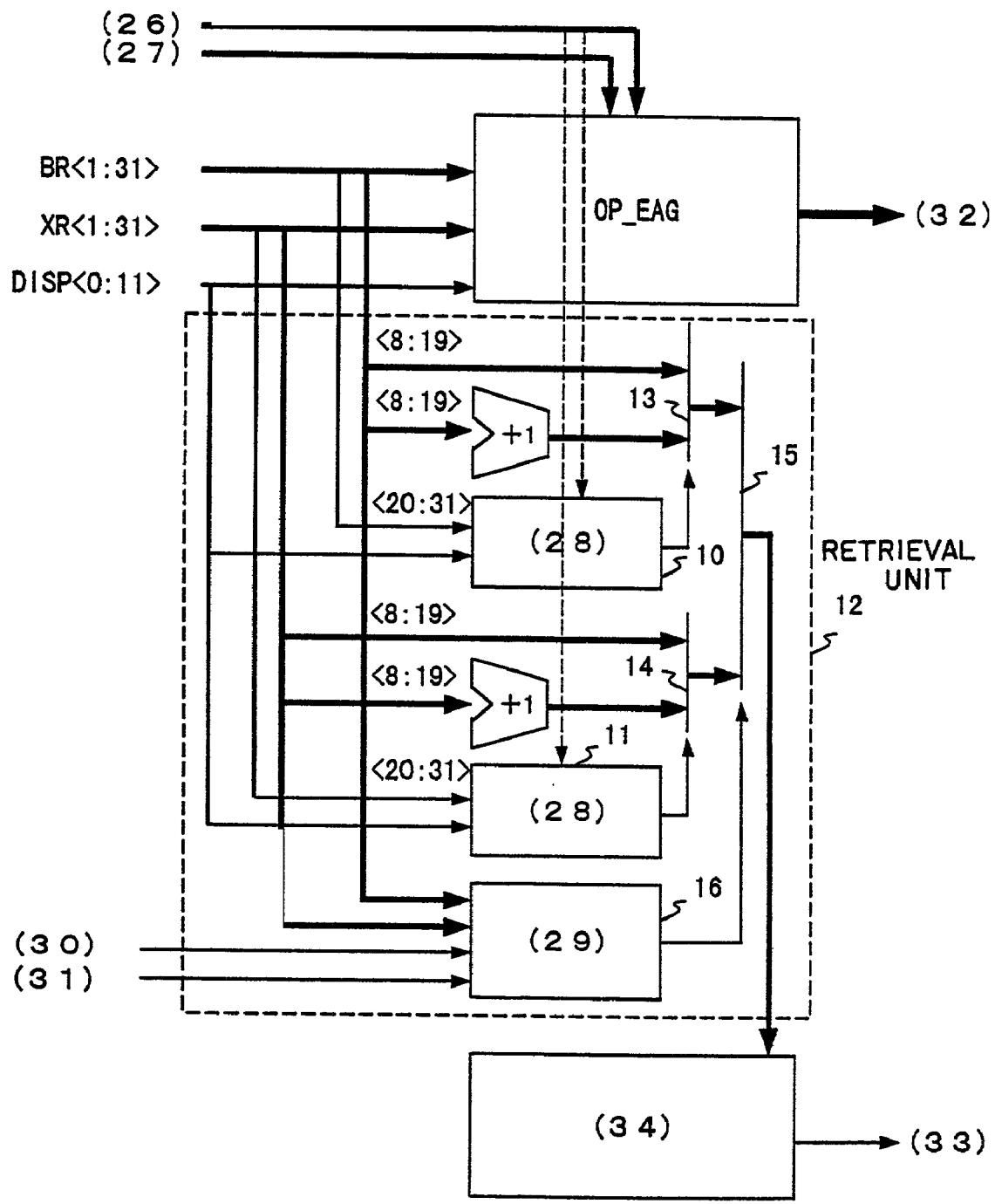
FIG. 7 shows the configuration of the preferred embodiment of an operand access unit.

FIG. 7 shows the configuration of the preferred embodiment of the operand access unit.

It is assumed that an absolute address history table for operand access adopts a 32-line×4-way set associative method and that for line access, the <15:19> of a logical address is used. It is also assumed that each entry is composed of an absolute address bit to be paired with a logical address <16:19> (ABSOLUTE_ADRS<16:19>: If a logical address bit <15:19> is inputted to the AAHT, a predicted absolute address<16:19> is outputted), the bit of a logical address <8:14> (LOGICAL_ADRS_TAG<8:14>) that is used to judge whether an address hits in the set associative method, that is, is used for address coincidence check, a replacement flag (LAST_ACCESS_FLAG) and +VALID indicating that the entry is valid. A person having ordinary skill in the art can easily understand that generally other configurations than this is also easily available.

If an instruction decoded by an instruction decoder is accompanied by memory access requiring an access destination address calculation, the instruction decoder transfers information needed for the address calculation (a register number and a displacement value) to the address arithmetic unit (OP_EAG). Specifically, a base register value BR<1:31>, an index register value XR<1:31> and a displacement value DISP<0:11> are inputted to the OP_EAG. The displacement value<0:11> is added to the bit<20:31> of the base register value <1:31> or index register value XR<1:31>.

The address arithmetic unit OP_EAG judges whether a register file should be retrieved or a unit for rewriting (for example, the cache unit if the register is loaded from a memory and an arithmetic unit if the register is rewritten by an operation), is bypassed, depending on whether a register file needed for the calculation is rewritten by the instruction being currently executed, and a logical address is calculated using the value. Specifically, if the register file is bypassed, BYPASS_BR<1:31> or BYPASS_XR<1:31> is inputted from the cache unit or arithmetic unit. Although in FIG. 7, it is indicated by broken lines that BYPASS_BR and BYPASS_XR are inputted to carry predicting units 10 and 11, respectively, it indicates that BYPASS_BR and BYPASS_XR can be used to retrieve data from the AAHT instead of the ordinary BX and XR, if requested, depending on the hardware configuration.

The memory access device of this preferred embodiment is installed accompanying the address arithmetic unit OP_EAG. Specifically, the device predicts the partial bit string of a real address in parallel with logical address calculation. Although in a system adopting a superscalar method and the like, a plurality of address arithmetic units OP_EAG for memory retrieval are installed, most of the devices of this preferred embodiment can be shared by the plurality of address arithmetic units OP_EAG.

It is assumed that this preferred embodiment comprises two address arithmetic units OP_EAG for cache access. However, in the following description, the units are represented by and described as EAG_x except when a plurality of the units must be described. If a plurality of the units are described, they are described, for example, like EAG_0 and EAG_1.

To OP_EAG, BR/XR or BYPASS_BR/BYPASS_XR are inputted, and a logical address EAC_x_LOGICAL_ADRS<1:31> is outputted. The bit<8:19> of BR and XR (also BYPASS_BR and BYPASS_XR depending on the hardware configuration) and a displacement value DISP<0:11> are also inputted to a retrieval unit 12. The bit<8:19> of BR and XR are obtained by combining the logical address<15:19> used for line access and logical address<8:14> used for address coincidence check.

In the retrieval unit 12, both BR<8:19> and a value obtained by adding "1" to BR<8:19> are inputted to a selector 13. Similarly, both XR<8:19> and a value obtained by adding "1" to XR<8:19> are inputted to a selector 14. Both BR<20:31> and DISP<0:11> are inputted to the carry predicting unit 10, and it is judged whether carry is caused, in other words, whether a page to be accessed is carried. The selector 13 is controlled based on this judgment, and BR<8:19>, as it is, or a value obtained by adding "1" to BR<8:19> is selected.

Quite similarly, both XR<8:19> and a value obtained by adding "1" to XR<8:19> are inputted to the selector 14, and either XR<8:19> or a value obtained by adding "1" to XR<8:19> is selected and outputted according to a carry prediction made by a carry predicting unit 11, based on both XR<20:31> and DISP<0:11>.

To a selector 16, BR<1:19>, XR<1:19>, BR_x_NUM<0:3>, which is a BR number, and XR_x_NUM<0:3>, which is an XR number, are inputted, and it is judged which should be inputted to the AAHT, the base register value BR or index register value XR, or whether neither the base register value BR nor the index register value XR is inputted. The address value outputted from the selector 15 is inputted to the absolute address history, and a predicted absolute address value EAG_x_ABS_ADRS<16:19> is outputted.

The details of both the carry predicting units 10 and 11 and selector 16 are described later.

Figure 8:
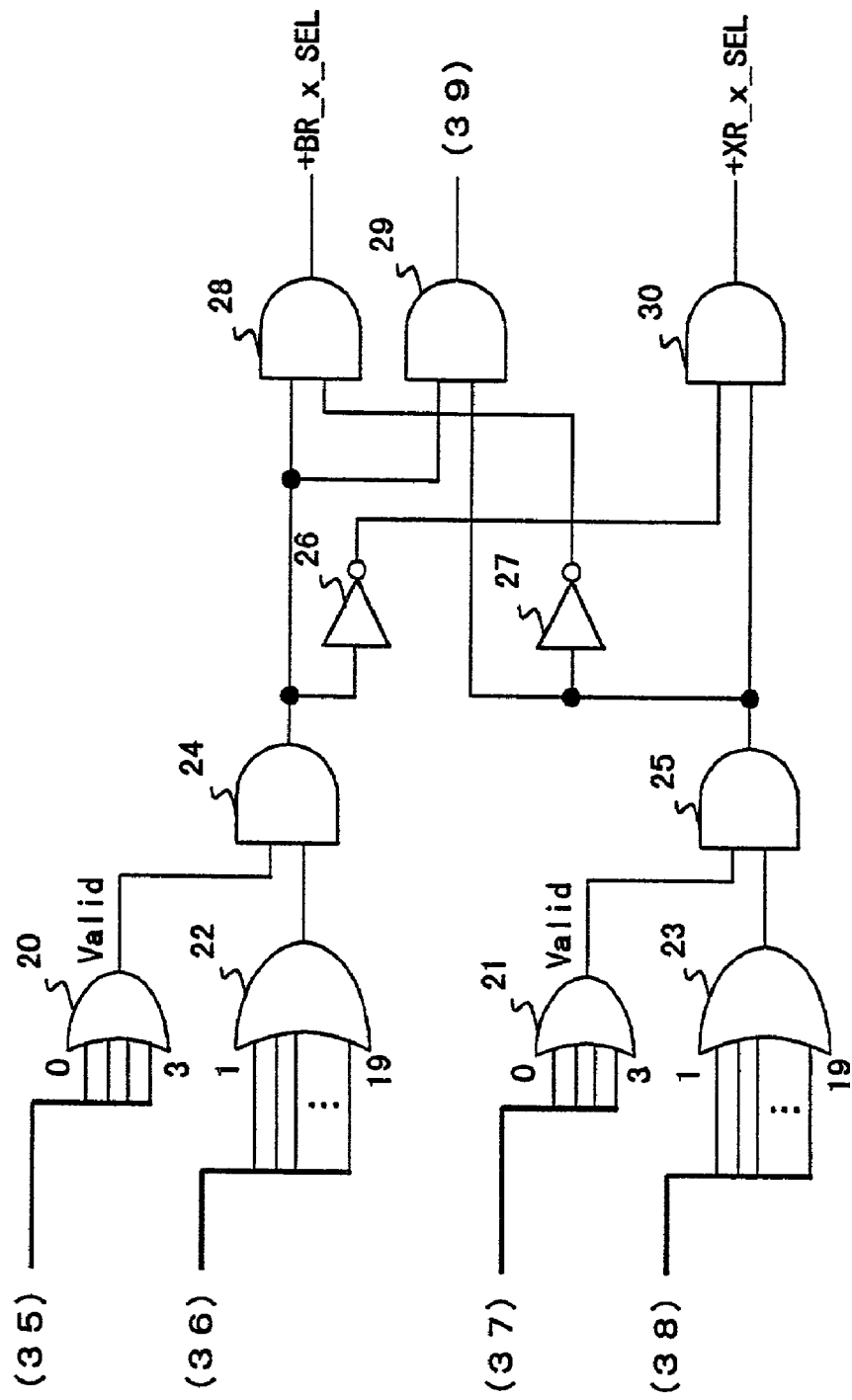
FIG. 8 shows one example configuration of a page register/index register selector (selector 16 shown in FIG. 7)

FIG. 8 shows an example configuration of a base register/index register selector (selector 16 shown in FIG. 7).

Since in this preferred embodiment, address width is assumed to be 31 bits, and at least one of the higher-order 19 bits (=31–12) is "1", a value of 4096 or more is stored. In other words, it is found that the value is large and exceeds the range of a byte index.

If both a base register value (+BR_x_DATA) and an index register value (+XR_x_DATA) are large, the retrieval of the absolute address history table using one register value always fails. Therefore, in this case, neither the base register value nor index register value is selected. If only one of the base register value or index register value is large or valid (if the register number designation is not "0"), the larger (or valid) one is selected. If both the base register value and an index register value are invalid, neither the base register value nor the index register value is selected.

By this circuit, a register that retrieves data from the absolute address history table is determined.

Specifically, in FIG. 8, a base register number (+BR_x_NUM<0:3>) and an index register number (+XR_x_NUM<0:3>) are inputted to OR circuits 20 and 21, respectively. In this case, only when both the base register number and index register number are "0", is a signal "0" outputted from each of the circuits 20 and 21, and is inputted to AND circuits 24 and 25, respectively. Therefore, if "0" is set for a register number, the respective outputs of the AND circuits 24 and 25 become 0, and no signal for selecting the register value of a register with register number "0" is outputted.

If the register number is not "0" and neither of the higher-order bits of the register value (+BR_x_DATA<1:19>and +XR_x_DATA<1:19>) is "0", signals "1" are outputted from each of the OR circuits 22 and 23. Accordingly, both the AND circuits 24 and 25 become "1". If the output of either of the AND circuits 24 and 25 is "1" and that of the other is "0", for example, if the output of the AND circuit 24 is "1" and that of the AND circuit 25 is "0", the output of the AND circuit 25 is converted to "1" by an inverter 27 and a base register selection signal (+BR_x_SEL) is outputted from an AND circuit 28. In the reverse case, the output of the AND circuit 24 becomes "0" and the output of the AND circuit 25 becomes "1", and an index register selection signal (+XR_x_SEL) is outputted from an AND circuit 30. If a signal "1" is outputted from each of the AND circuits 24 and 25, a signal (+BR+XR_x_LARGE) indicating that no register should be selected is outputted from an AND circuit 29.

Next, the carry predicting unit is described. In order to finish a real address prediction, including carry prediction, the prediction processes are performed in parallel.

Figure 9:
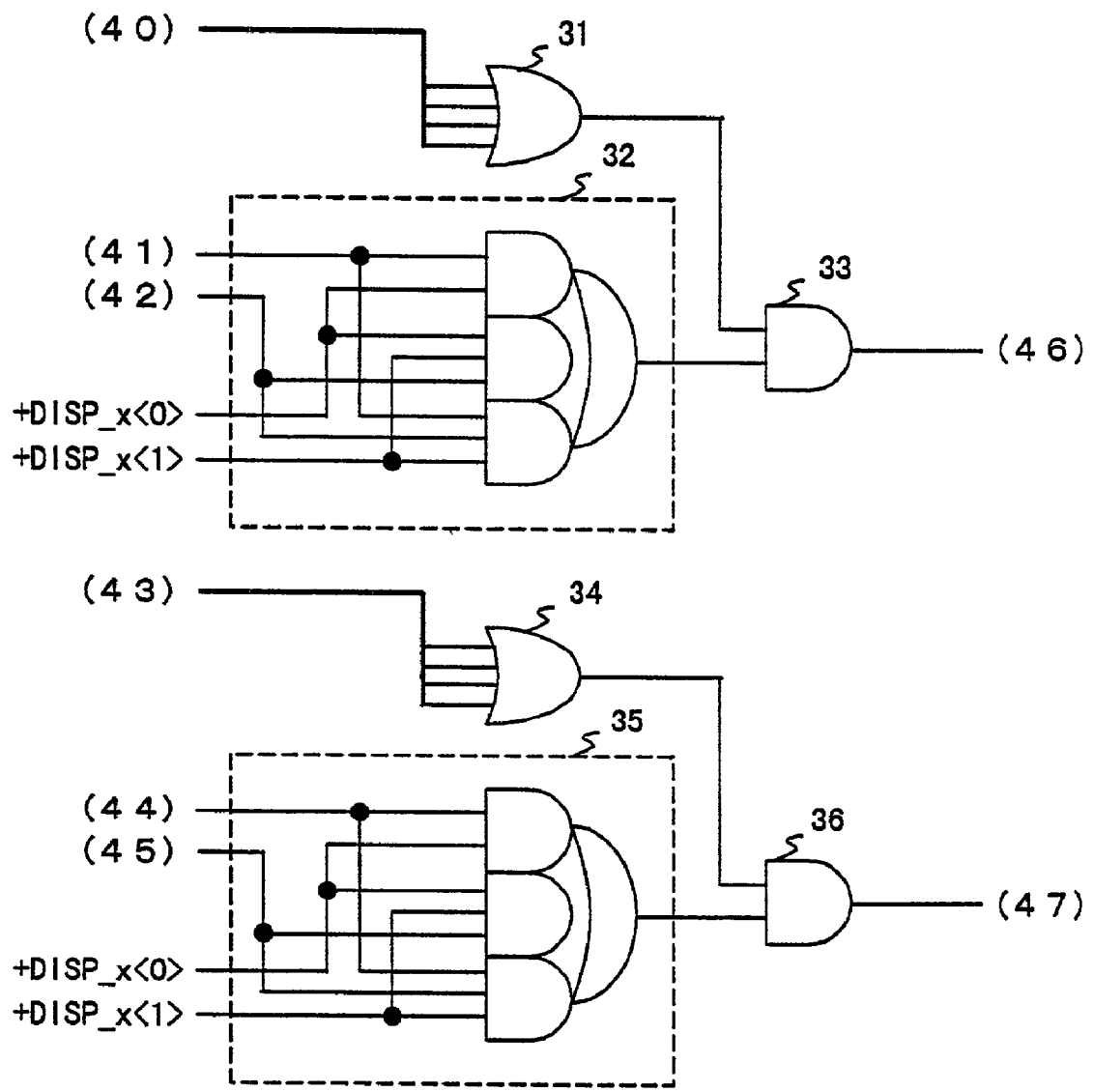
FIG. 9 shows the configuration of the first preferred embodiment of a carry predicting unit.

FIG. 9 shows the configuration of the first preferred embodiment of the carry predicting unit.

In this preferred embodiment, carry prediction is performed by adding only the respective two higher-order bits in the byte index sections of base register data (+BR_x_DATA) and index register data (+XR_x_DATA) specifically, it is predicted that if adding the respective two higher-order bits in the byte index section of the selected register and a displacement value causes carry to the third bit, carry occurs.

Specifically, first, an OR circuit 31 judges whether the base register number is "0". If the base register number is "0", the output of an AND circuit 33 becomes "0" and the carry prediction signal of the base register value (+BR_x_CARRY_PREDICT) is not generated. If the base register number is not "0", both the two higher-order bits<20> and <21> in the byte index section of the base register value (+BR_x_DATA) and the two higher-order bits<0> and <1> of the displacement value (+DISP) are inputted to a judgment circuit 32. If both +BR_x_DATA<20> and +DISP<0> are "1", if both +BR_x_DATA<20> and +DISP<0>/<1> are "1" or if both +BR_x_DATA<20>/<21> and +DISP<1> are "1", carry is caused in the judgment circuit 32. Therefore, in these cases, a signal "1" is outputted from the judgment circuit 32. Since the base register number is not currently "0", the output of an AND circuit becomes "1" and the carry prediction signal of the base register value (+BR_x_CARRY_PREDICT) is outputted.

The circuit for an index register value shown in the lower part of FIG. 9 is the same as that of the base register value described above. Specifically, an OR circuit 34 judges whether the index register number is "0". A judgment circuit 35 judges whether carry will be caused, using both the two higher-order bits in the byte index section of the index register data (+XR_x_DATA) and the two higher-order bits of the displacement DISP. If the index register number is not "0" and if it is judged that carry will be caused, the carry prediction signal of the index register value (+XR_x_CARRY_PREDICT) is outputted from an AND circuit 36.

Although in the preferred embodiment described above, carry is predicted using only both the two higher-order bits of the byte index section and the two higher-order bits of the displacement value, the greater number of bits or all the bits of both the base register data and index register data can also be used for the carry prediction if there is room for calculation time in the hardware configuration. In this case, both the greater number of bits or all the bits of the base register data and the greater number of bits or all the bits of the displacement value are inputted to the judgment circuit 32, and both the greater number of bits or all the bits of the index register data and the greater number of bits or all the bits of the displacement value are inputted to the judgment circuit 34. Then, the bits are added and it is judged whether carry will actually be caused. A person having ordinary skill in the art can easily implement the specific configuration for that purpose.

Figure 10:
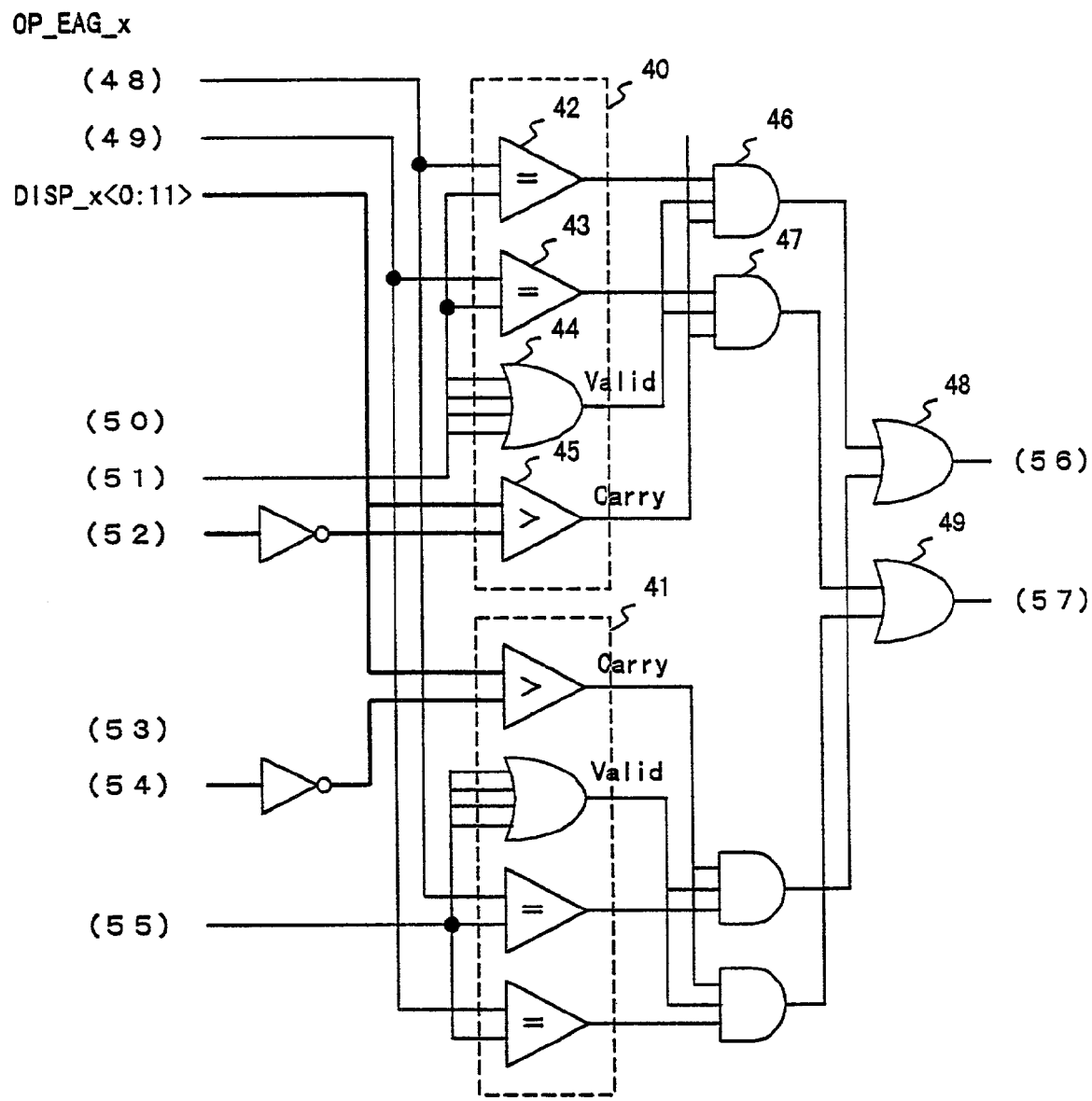
FIG. 10 shows the configuration of the second preferred embodiment of a carry predicting unit (No. 1)
Figure 11:
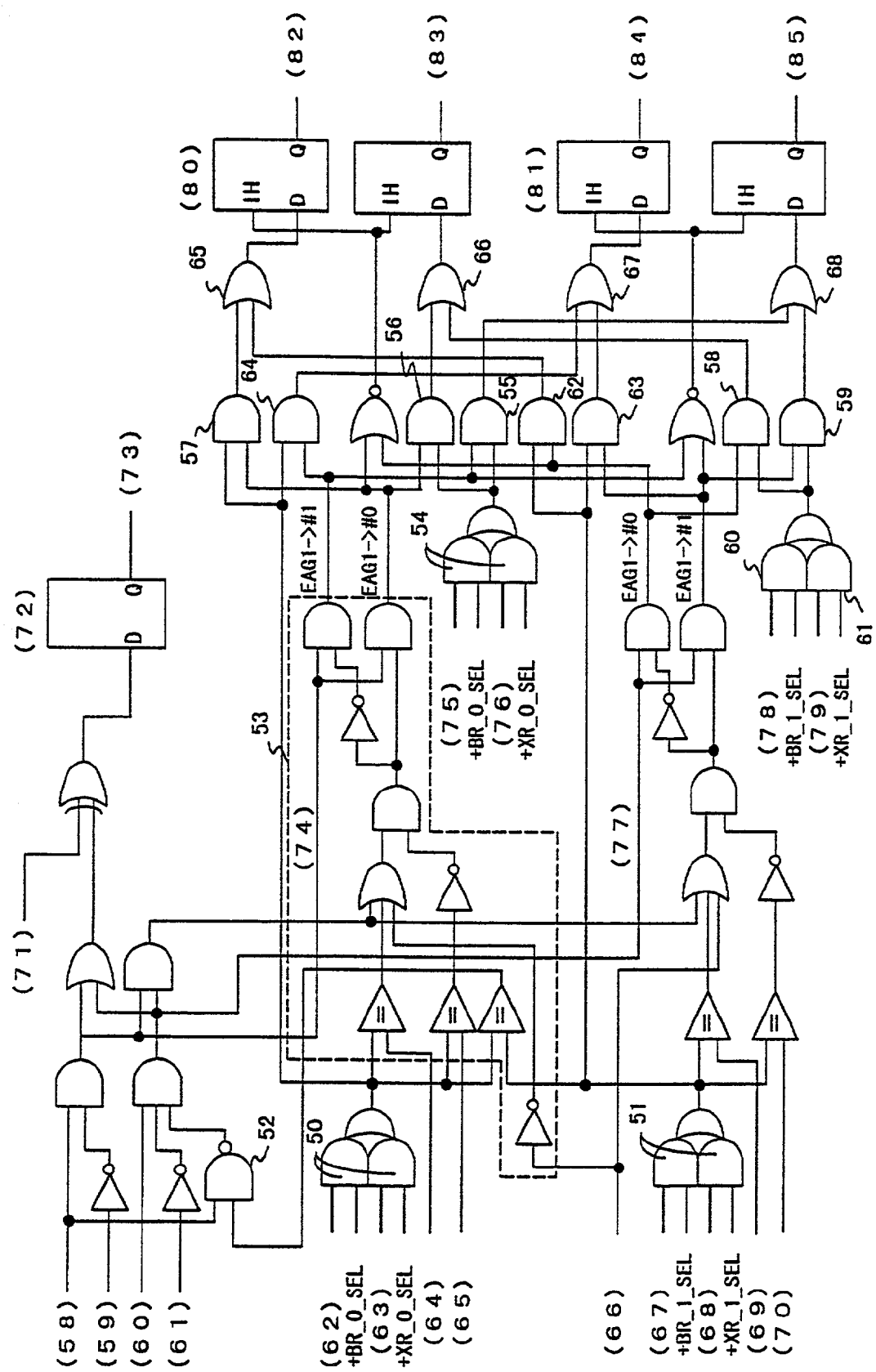
FIG. 11 shows the configuration of the second preferred embodiment of a carry predicting unit (No. 2)

FIGS. 10 and 11 show the configurations of the second preferred embodiment of the carry predicting unit.

First, FIG. 10 shows the configuration of the reader of the carry predicting unit. It is assumed that this preferred embodiment stores a maximum of two register numbers in which carry has been caused before by adding a register value and a displacement value. In the following description, this register number storage part is called carry register #0 and carry register #1. In the present invention, the number of carry registers is not restricted.

In this preferred embodiment, it is assumed that if a value stored in a carry register is "0", it means that the memory content is invalid. By doing so, there is no need to provide a special valid signal and, accordingly, circuit costs can be reduced.

First, a base register number BR_x_NUM<0:3>, an index register number XR_x_NUM<0:3> and a displacement value DISP_x<0:11> are inputted from the address arithmetic unit OP_EAG_x. Both the base register number or an index register number stored in the carry register #0 CARRY_REG_0_NUM<0:3>, and the byte index value of the logical address stored in the carry register #0 CARRY_REG_0_BYTE<20:31> are inputted from the carry register CARRY_REG#0. Similarly, both CARRY_REG_1_BYTE<20:21> and CARRY_REG_1_NUM<0:3> are inputted from the carry register #1.

Comparison units 40 and 41 performs the same comparison process for the carry registers #0 and #1, respectively. A comparator 42 first compares base register numbers BR_x_NUM and CARRY_REG_0_NUM. If they are matched, "1" is outputted. A comparator 43 compares XR_x_NUM with CARRY_REG_0_NUM. If they are matched, "1" is outputted. An OR circuit 44 judges whether CARRY_REG_0_NUM is "0". If it is not "0", "1" is outputted. Furthermore, a comparator 45 compares DISP_x with a byte index value obtained by logically inverting the byte index of CARRY_RG_0_BYTE. The comparator 45 indicates that if DISP_x is larger than the logical inversion of CARRY_REG_0_BYTE, carry will be caused. In this case, a carry signal is designated to be "1". Then, this signal is inputted to both AND circuits 46 and 47. Therefore, if the register number and the base register number that are stored in the carry register #0 are matched, if the register number stored in the carry register #0 is not "0" and if the displacement value is larger than the inverted value of the byte index value stored in the carry register #0, the carry predicting value of the base register value +BR_x_REG_CARRY_PREDICT is generated. The same fact also applies to a carry register #1 side. If carry prediction is available in either of carry registers #0 and #1, +BR_x_REG_CARRY_PREDICT is generated. Similarly, if as for an index register value, XR_x_NUM coincides with CARRY_REG_0_NUM or CARRY_REG_1_NUM, if CARRY_REG_0_NUM or CARRY_REG_1_NUM is not "0" and if DISP_x is larger than inverted CARRY_REG_0_BYTE or inverted CARRY_REG_1_BYTE, the carry predicting signal of the index register +XR_x_REG_CARRY_PREDICT is generated by an OR circuit 49.

FIG. 11 shows the configuration of the carry register registering unit of the carry predicting unit.

First, it is assumed that the carry (in this preferred embodiment, bit digit carry from<20>to <19>) signal of the byte index value generated in the calculation of EAG_x is +EAG_x_PAGE_CROSS. If both the base register value and index register value are large, registration is meaningless. Therefore, it is judged whether the calculation result of each EAG should be registered by inverting a signal +BR+XR_x_LARGE and taking the AND of +EAG_x_PAGE_CROSS and the inverted signal +BR+XR_x_LARGE.

The register numbers to be stored (+BR_x_NUM<0:3> and +XR_x_NUM<0:3>) and the byte index section of the corresponding register values (+BR_x_DATA<0:3> and +XR_x_DATA<0:3>) are selected by a base/index register selection signal (+BR_x_SEL, +XR_x_SEL). The devices 50 and 51 described as ANS circuits in FIG. 11 are selectors or gates for judging whether a register number should be outputted by +BR_x_SEL and +XR_x_SEL, respectively. If both EAG_0 and EAG_0 use the same register and if as a result of the judgment described above, both should be registered, the operation of the registration circuit of EAG_0 is suppressed (AND circuit 52) and the number of this commonly used register is written in a carry register by the registration circuit of EAG_0.

In this preferred embodiment, a flag (+REPLACE_FLAG) for selecting a carry register to be updated (to be rewritten) from these two carry registers is provided. A number to be rewritten is determined based on the value of this flag. For example, if this flag is set to "0", the carry register #0 is rewritten. If this flag is set to "1", the carry register #1 is rewritten. Every time a carry register is rewritten, the value is changed by taking the exclusive OR (EOR) of the value and the flag. Therefore, the other side that was not immediately rewritten before is rewritten.

However, if the same register is already registered when rewriting is attempted, writing is performed for the register instead of determining the writing destination using +REPLACE_FLAG. This operation is performed by a circuit for checking the coincidence with +CARRY_REG_n_NUM<0:3> and a gate located after the circuit in FIG. 11 (part described as 53 enclosed with broken lines in FIG. 11). If both EAG_0 and EAG_0 cause carry, this gate is designed so that the carry information of EAG_0 and that of EAG_1 can be written in registers #0 and #1, respectively. For example, EAG_0 #1 located near the center of FIG. 11 indicates that the result from EAG_0 is written in the carry register #1 (circuit device (selector or gate) described as 55 in FIG. 11). Devices 55 to 64 described as AND circuits in FIG. 11 are actually selectors or gates for outputting data in response to signal input, and devices 65 to 68 described as OR circuits are actually gates for outputting data if any of a plurality of pieces of data is inputted. AND circuits and OR circuits to which data of a plurality of bits and a signal of one bit are inputted, of the circuit devices shown in FIG. 11, are gates and the like for outputting data in response to the signal input.

Generally speaking, instead of such a method, a writing destination can also be determined by another algorithm.

Table 1 shows the logic of the writing destination determination circuit part of the carry register developed shown in FIG. 11. "–" in Table 1 represents "Either" (either "0" or "1" is acceptable). CR#n represents the carry register #n of this preferred embodiment. REPL represents the value of +REPLACE_FLAG. Table 1—a logic of the selection unit shown in FIG. 11.

| Write request source | | Coincidence with CR#0 | | Coincidence with CR#1 | | Writing destination From EAG_0 | From EAG_1 |
|---|---|---|---|---|---|---|---|
| EAG_0 | EAG_1 | EAG_0 | EAG_1 | EAG_0 | EAG_1 | | |
| 0 | 0 | — | — | — | — | not written | not written |
| 1 | 0 | 0 | — | 0 | — | REPL | not written |
| 1 | 0 | 1 | — | 0 | — | CR#0 | not written |
| 1 | 0 | 0 | — | 1 | — | CR#1 | not written |
| 0 | 1 | — | 0 | — | 0 | not written | REPL |
| 0 | 1 | — | 1 | — | 0 | not written | CR#0 |
| 0 | 1 | — | 0 | — | 1 | not written | CR#1 |
| 1 | 1 | — | — | — | — | CR# | CR#1 |

A plurality of carry predictions by these methods can also be simultaneously used. In this case, it is acceptable if the logical OR of the respective prediction signals is designated as a carry prediction signal.

A logical address for retrieving data from the absolute address history table (PREDICT_LAR_x<8:19>) can be calculated using the carry prediction/carry register selector.

Figure 12:
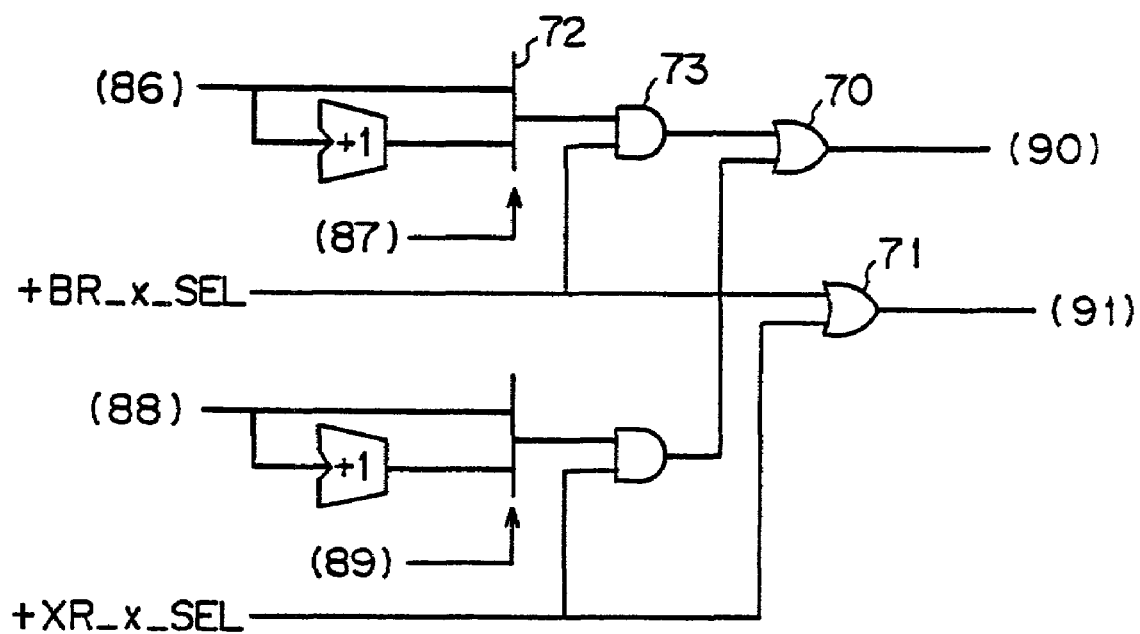
FIG. 12 shows one example configuration of a logical address generator used to retrieve data from an absolute address history table.

FIG. 12 shows an example configuration of a logical address generation circuit for retrieving data from the absolute address history table.

However, if a register pair/logical address history, which is described later, is used, either a value obtained by a circuit provided in relation to OP_EAG_0 and that obtained by a circuit provided in relation to OP_EAG 1 is selected by a signal +BR+XR_x_LARGE and is used as a necessary logical address equivalent value.

The absolute address history table is retrieved using the logical address equivalent value calculated in this way, and necessary bits of the real address are outputted.

FIG. 12 is described below. A circuit for base register data and one for index register data are the same. Since devices

70 and 71 output either base register data or index register data later (takes the OR), only the circuit for base register data is described.

An address value +BR_x_DATA<8:19> stored in the base register is inputted from the base register. +BR_x_DATA<8:19> is directly inputted to a selector 72 and simultaneously a value obtained by an adder adding "1" to the address value is also inputted to the selector 72. Which address is outputted is determined by +BR_x_CARRY_PREDICT, which is the output value of the circuit shown in FIG. 9. If there is no carry, the original address is outputted. If there is carry, the value obtained by an adder adding "1" to the original address is outputted.

Then, the output value +BR_x_SEL of the circuit shown in FIG. 8 is inputted to a device 73, and the address value from the selector 72 is outputted. As is known from the circuit shown in FIG. 8, both +XR_x_SEL and +BR_x_SEL do not simultaneously become "1". Therefore, only one of the address values based on a base register or that based on an index register is inputted to a device 70, and a logical address value for AAHT retrieval +PREDICT_LAR_x<8:19> is outputted. Since either +BR_x_SEL or +XR_x_SEL is outputted, a signal indicating prediction validity +PREDICT_VALID_x is outputted through an OR circuit 71.

FIG. 13 shows the configuration for selecting an entry to the absolute address history table and outputting a predicted absolute address.

It is assumed that this preferred embodiment adopts a 4-way set associative method.

Data of 32 lines are outputted from the AAHT. A selector 80 selects the data and outputs the data to four ways using the bit<15:19> of PREDICT_LAR_X obtained by the circuit shown in FIG. 12. The bit<8:14> of the address data outputted to ways 0 to 3 is inputted to each comparator 82 and is compared with the bit<8:14> of PREDICT_LAR_x. The valid signals +VALID of the AAHT entry outputted to ways 0 to 3 are inputted to a comparator 83, the selection signal of the valid entry of ways in which the comparator 82 judges that the bit<8:14> of the address data coincides with the bit<8:14> of PREDICT_LAR_x, is generated. Then, a selector 81 outputs the absolute address of the selected way ABSOLUTE_ADRS<16:19> as a predicted absolute address EAG_x_ABS_ADRS<16:19>.

If it is judged that both the index register value and base register value are large, the retrieval of the absolute address history table fails. In this case, a write-back suppression signal can also be transmitted to the cache unit. By transmitting this signal, the writing-back of the correct logical address/real address pair can be suppressed. If this method is adopted, in the same case, the table cannot be correctly retrieved in the future when both the index register value and base register value are large. Therefore, even if the result is written back, there is a low possibility that the pair may be used in the future. In other words, by not writing back such a pair that is not used, the table use efficiency can be improved.

FIG. 14 shows an example configuration of a register pair history based on a logical address.

In the circuit shown in FIG. 14, the base register number BR_x_NUM, index register number XR_x_NUM and logical address calculated by OP_EAG (+EAG_x_LOGICAL_ADRS) are inputted to latches 90, 91 and 92, respectively, using a signal (−BR+XR_x_LARGE) obtained by logically inverting the output of the circuit shown in FIG. 8 as a trigger and are outputted as +LARGE_BR_x_NUM, +LARGE_BR_x_NUM and +LARGE_LAR_x, respectively.

Each of the signals outputted from the circuit shown in FIG. 14 is used in a circuit, which is described later.

Figure 15:
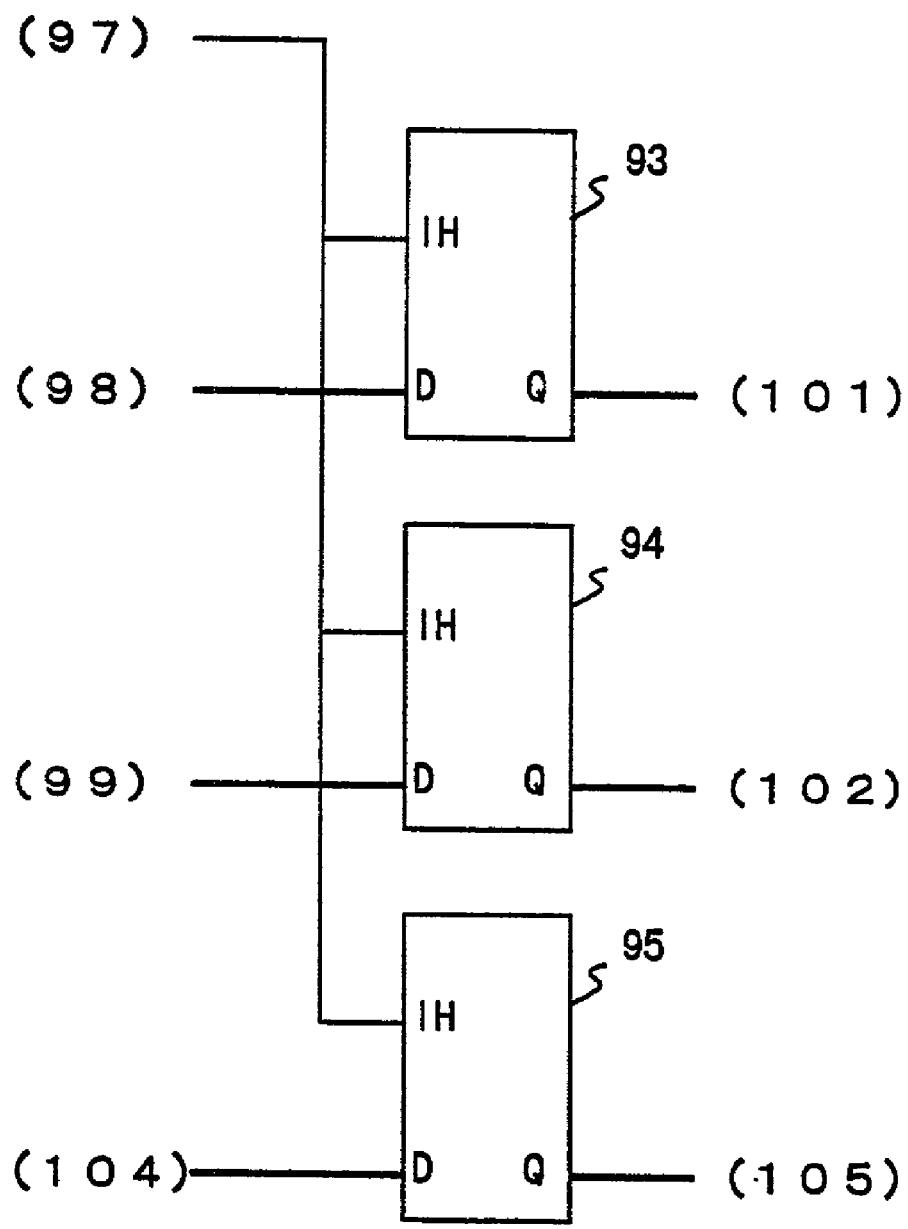
FIG. 15 shows one example configuration of a register-pair history based on an absolute address.

FIG. 15 shows an example configuration of a register pair history based on an absolute address.

The circuit shown in FIG. 15 is basically the same as that shown in FIG. 14. −BR+XR_x_LARGE<BR_x_NUM and XR_x_NUM are inputted to each of latches 93 and 94. Then, +LARGE_BR_x_NUM and+LARGE_XR_x_NUM are outputted using +LARGE_BR_x_LARGE as a trigger.

To a latch 95, instead of the logical address from OP_EAG, an absolute address (+TLB_x_ABS_ADRS) obtained by translating this logical address by a TLB is inputted and is outputted as +LARGE_ABS_ADRS_x.

These output signals are also used in a circuit, which is described later.

FIG. 16 shows an example configuration of a register pair/address history selector used in the case where both a base register value and an index register value are large.

A comparator 96 compares a base register number (+BR_x_NUM) with +LARGE_BR_0_NUM, and also compares an index register number (+XR_x_NUM) with +LARGE_XR_0_NUM. If each of the pairs is matched, a signal "1" is outputted. Similarly, a comparator 97 compares +BR x_NUM with +LARGE_BR_1_NUM, and also compares +XR_x_NUM with +LARGE_XR_1_NUM. If each of the pairs is matched, a signal "1" is outputted.

Then, the outputs of the comparators 96 and 97 are inputted to AND circuits 98 and 99, respectively, and simultaneously +BR+XR_x_LARGE is inputted to each of the AND circuits 98 and 99. Therefore, if +BR_x_NUM coincides with +LARGE_BR_0_NUM, if +XR_x_NUM coincides with+LARGE_XR_0_NUM and if +BR+XR_x_LARGE is inputted, the AND circuit 98 outputs +USE_x_REG_PAIR_HISTORY_0 indicating that a register #x uses a pair history #0. Similarly, if +BR_x_LARGE coincides with +LARGE_BR_1_NUM, +XR_x_NUM coincides with +LARGE_XR_1_NUM and if +BR+XR_x_LARGE is inputted, the AND circuit 99 outputs +USE_x_REG_PAIR_HISTORY_1 indicating that a register #x uses a pair history #1.

FIG. 17 shows an example configuration of the real address output generator of the register pair/absolute address history.

The register pair/absolute address history (see FIG. 15) stores both a pair of a base register number and an index register number in the case where both the base register value and index register value are large, and the corresponding real address (partial bit string).

Therefore, as shown in FIG. 17, if the +USE_x_REG_PAIR_HISTORY_0 of the circuit shown in FIG. 16 is inputted, +LARGE_ABS_ADRS_0<8:19>, which is the real address output shown in FIG. 15 is selected. Similarly, if the +USE_x_REG_PAIR_HISTORY_0 of the circuit shown in FIG. 16 is inputted, +LARGE_ABS_ADRS_1<8:19> is outputted. The real address signal outputted in this way is outputted as +PREDICT_ABS_x_PAIR<8:19> and is used as a predicted absolute address.

Figure 18:
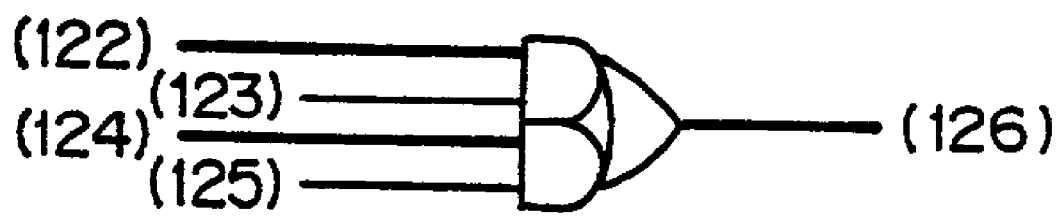
FIG. 18 shows one example configuration of a circuit for outputting the logical address of a register-pair/logical address history.

FIG. 18 shows an example configuration of a circuit for outputting the logical address output of the register pair/logical address history.

As shown in FIG. 18, if the +USE_x_REG_PAIR_HISTORY_0 of the circuit shown in FIG. 16 is inputted, +LARGE_LAR_0<8:19>, which is the logical address output shown in FIG. 14, is selected. Similarly, if the +USE_x_REG_PAIR_HISTORY_0 of the circuit shown in FIG. 16 is inputted, +LARGE_LAR_1<8:19> is outputted.

If a logical address corresponding to a register pair is stored (in the case of a register pair/logical address history), the absolute address history table is retrieved using the logical address of the output shown in FIG. 18. If the logical OR of the output shown in FIG. 18 and that shown in FIG. 12 is taken, the circuit can be incorporated into the preferred embodiment in the case where only one register is used.

Compared with the case where the real address is stored, which is described earlier, in this case, there is no need to store information about a register pair and the like in the fetch port of the cache unit. Therefore, a circuit configuration is simplified.

The cache unit (LBS (Local Buffer Storage)) is provided with a management area allocated for each access request (hereinafter called a "fetch port").

Figure 19:
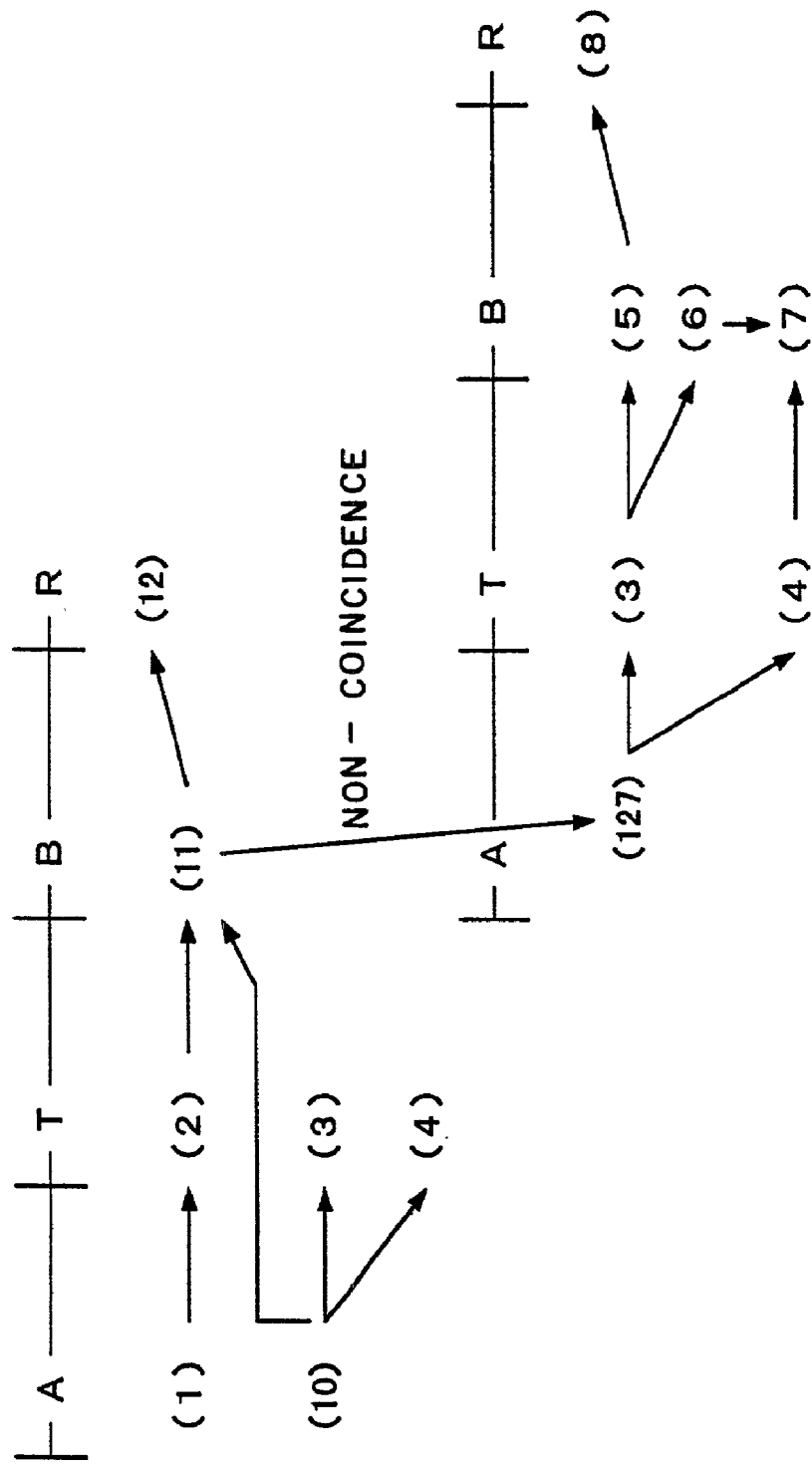
FIG. 19 shows the execution cycle in the case of a TLB failure in the cache unit.

The correct absolute address obtained by retrieving data from a TLB and the predicted absolute address are compared. If they are not matched, a corresponding fetch port performs controls to retrieve data from an LBS in a cycle as shown in FIG. 19 by securing the priority of LBS access. For this retrieval address, the absolute address obtained as a retrieval result of the TLB, which is known to be correct, can be used. Alternatively, the correct address pair of the TLB retrieval result can be written into the absolute address history table.

Specifically, in FIG. 19, a logical address to be fetched in cycle A is generated and simultaneously an absolute address is predicted. In cycle T, an absolute address is calculated by retrieving data from the TLB using the fetched logical address. Simultaneously, both an LBS tag and LBS data are read using the predicted absolute address. Then, when in cycle B, the predicted absolute address and correct absolute address obtained from the TLB are compared, non-coincidence occurs. Then, in cycle R, a correct address correspondence is written back in the AAHT and simultaneously a new process starts. Specifically, in the cycle T of the new process, both an LBS tag and LBS data are read. Then, in cycle B, exception check, way selection, the setting of LBS data in a buffer or the like is performed and in cycle R, the result is confirmed.

If it is known in advance that absolute address prediction will fail, specifically, if the absolute address history is not hit, or if it is judged that both index/base register values are large, as described earlier), it is known in advance that the result is discarded even if an LBS is retrieved (However, it is assumed that a register pair history is not used. If a register pair history is used, there is a high possibility that prediction succeeds. Therefore, usually there is no exception process. Therefore, an exception process in the case where a register pair history is not used or in the case where even if a register pair history is used, prediction failure can be anticipated in advance for other reasons, as described with reference to FIG. 20). In this case, the control described with reference to FIG. 20, in other words, an intra-cache operation without TLB retrieval can also be performed in parallel by not retrieving data from an LBS. For example, if there is an incorrect absolute address prediction two clocks before, such a parallel operation is possible.

Alternatively, if it is judged that both index/register values are large, the fact can be stored in the fetch port and writing-back the TLB retrieval result in the absolute address history table can be suppressed.

Figure 20:
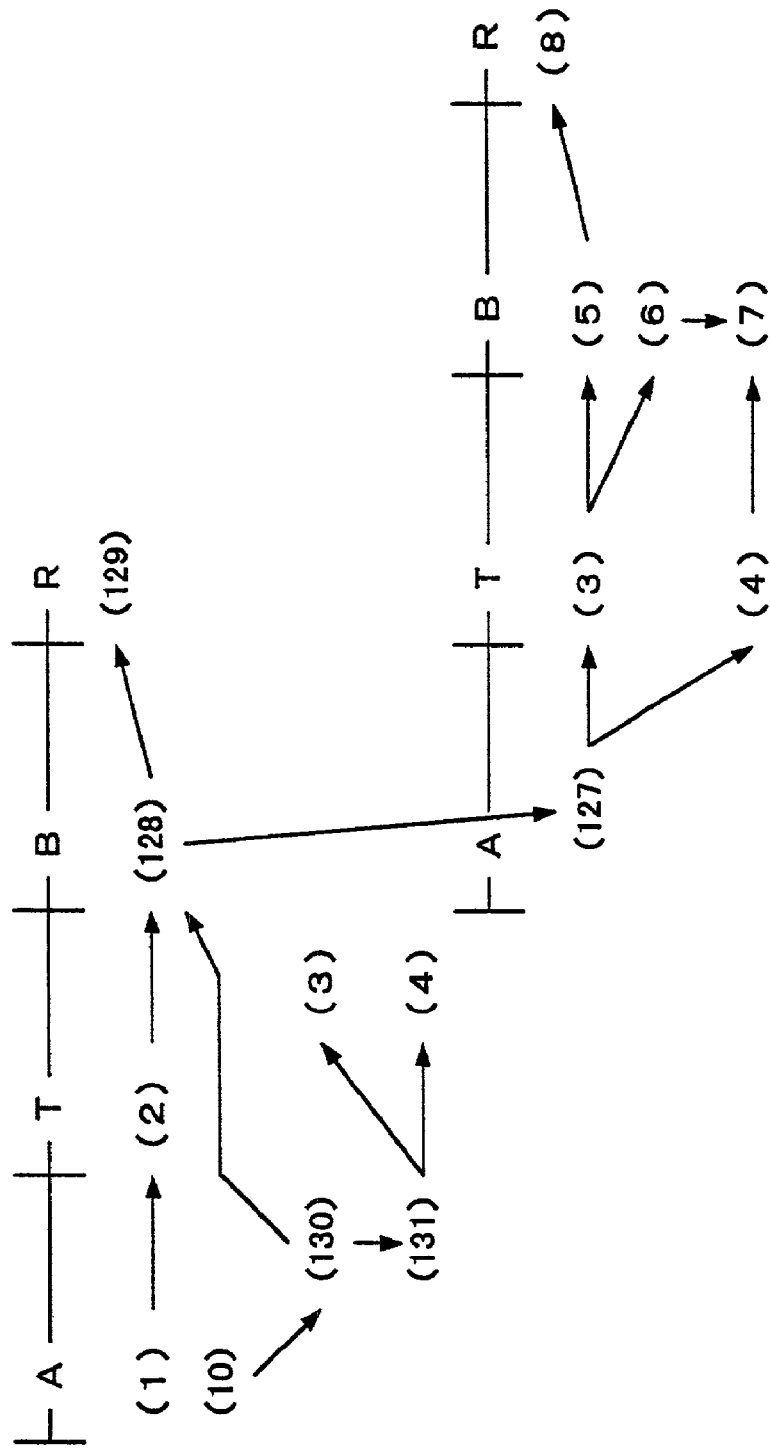
FIG. 20 shows the execution cycle in the case where prediction failure is known in advance.

Specifically, in FIG. 20, in cycle A, a logical address to be fetched is generated and simultaneously an absolute address is predicted. Then, when the failure of the absolute address prediction is determined, the priority and the like of cache retrieval in which the absolute address is determined, is secured, in cycle T, both the LBS tag and LBS data are read and subsequent processes are performed. As for an instruction, the absolute address prediction of which fails, in cycle T, an absolute address is calculated by retrieving data from a TLB, and, in cycle B the absolute address is determined. Then, in cycle R, a correct address is written back in the AAHT. In this case, if it is judged that both BR and XR are large, the writing-back is suppressed. Furthermore, when in cycle B the absolute address is determined, another process starts. Specifically, in cycle A, the absolute address obtained by retrieval from a TLB is determined. Then, as usual, in cycle T, both an LBS tag and LSB data are read; in cycle B, exception check, way selection, the setting of data in a buffer or the like is performed; and in cycle R, the result is confirmd.

Next, an absolute address history table writing unit is described.

FIG. 21 shows an example configuration of a circuit for determining a writing way.

If both an absolute address ABSOLUTE_ADRS<16:19> and a logical address LOGICAL_ADRES<8:19> are inputted from a TLB, the bit<15:19> of LOGICAL ADRS is used for the AAHT to select a line, and a logical address tag, a valid flag and an immediately preceding access flag are outputted to four ways. A comparator 100 compares the logical address tag outputted to ways 0 to 4 with the bit<8:14> of the logical address inputted from the TLB, and outputs a signal "1" to the way in which the tag coincides with the bit. If there is at least one way in which the tag coincides with the bit, of the four ways, a signal Tag_Match is inputted to selectors 102 to 105. Furthermore, the valid flag of the data of the ways 0 to 3 outputted from the AAHT is inputted to a way selector 106 (see FIG. 22). The way selector 106 determines a way to perform a new write and controls each of selectors 102 to 105. If there is a way in which the tag coincides with the bit and if the way is a destination to write, the destination selector 106 outputs the write-valid signal of a specific way WAYx_WRITE_VAL. The way selector 106 also generates a signal for setting the last access flag SET_LASTACC_FLAG and outputs the signal together with both an absolute address ABSOLUTE_ADRS<16:19> and LOCAL_ADRS_TAG<8:14>. The bit<8:14> of the logical address inputted from the TLB is also outputted as an AAHT line selection signal AAHT_LINE<0:4>.

Specifically, if there is a matching logical address in which a tag bit coincides with an access bit, in the absolute address history table when data to write are inputted from the TLB, the data are overwritten on the logical address. If there is no matching logical address and if there is an invalid entry, a new entry is generated there. If there is no invalid entry, a writing way is determined based on the previous access history and the like, and the old entry is replaced with a new entry (see FIG. 22). Since a circuit for selecting a writing way based on the previous access history (replace-way selector 110 shown in FIG. 22) is already publicly known in a set associative cache system and the like, the details are not described here.

Figure 22:
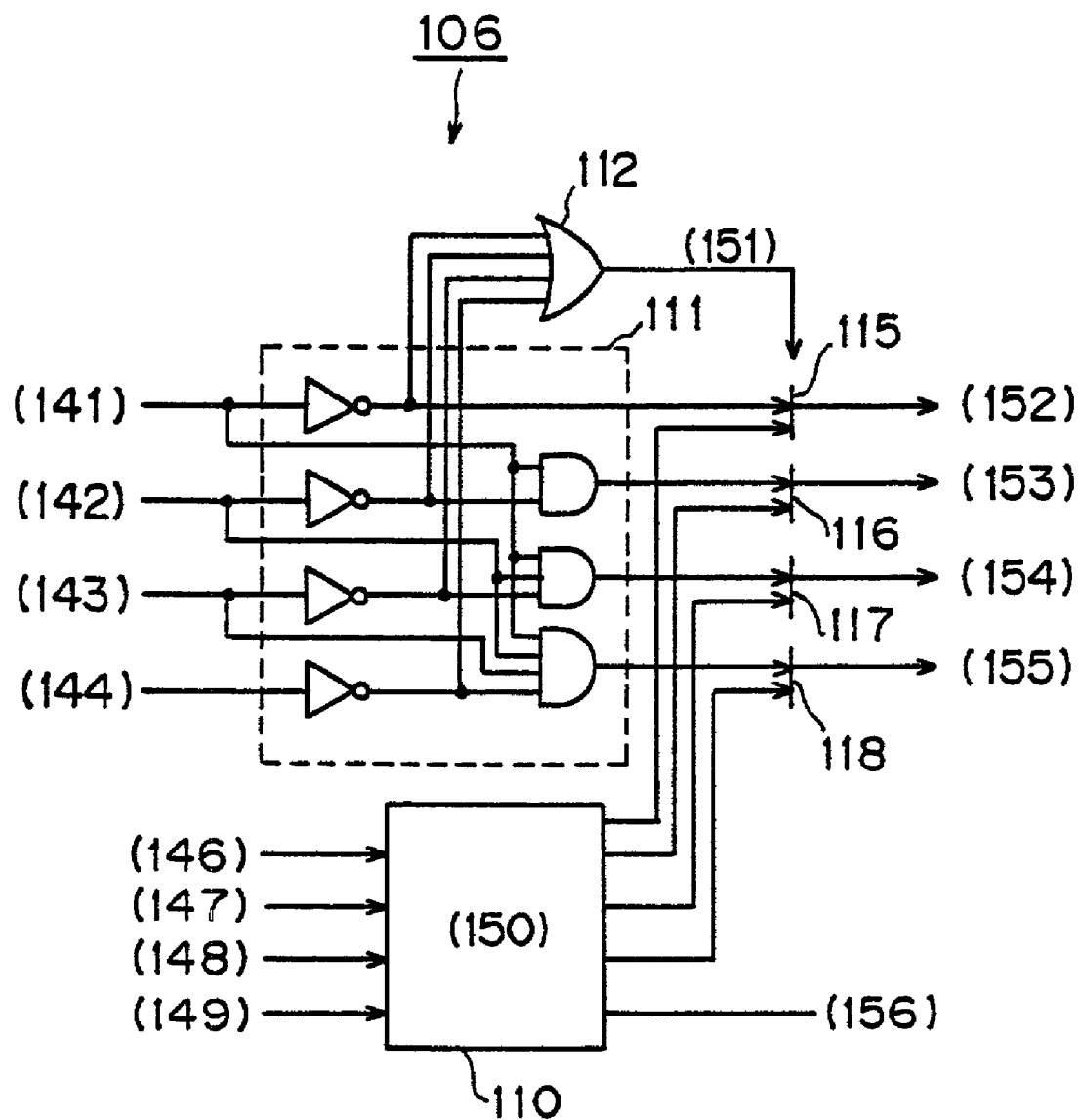
FIG. 22 shows one example configuration of the way selector 106 shown in FIG. 21.

FIG. 22 shows an example configuration of the way selector 106 shown in FIG. 21.

To a way selector 106, both the valid signal of each way (+WAYx_VALID) and an immediately preceding access flag (+WAYx_LASTACC_FLAG) are inputted from the AAHT. A selector 111 outputs a signal for searching for a way that becomes invalid from the valid signals of ways 0 to 3 and selecting the way as a way candidate to write. If there is even one invalid way, an OR circuit 112 inputs a signal EXIST_INVALID indicating that there is an invalid entry, to selectors 115 to 118. Furthermore, the way selector 106 inputs the immediately preceding access flags of ways 0 to 3 to a replace-way selector 110 used to select a way in the conventional set associative method, makes the replace-way selector 110 generate a rewrite-way selection signal, inputs the signal to selectors 115 to 118 and outputs an immediately preceding access flag set signal (+SELECT_LASTACC_FLAG). If there is an invalid way and the way matches a way selected by the replace-way selector, the selectors 115 to 118 outputs a way selection signal (+WAYx_WR_SEL_NO_MATCH) to be supplied to the selectors 102 to 105 shown in FIG. 21.

Figure 23:
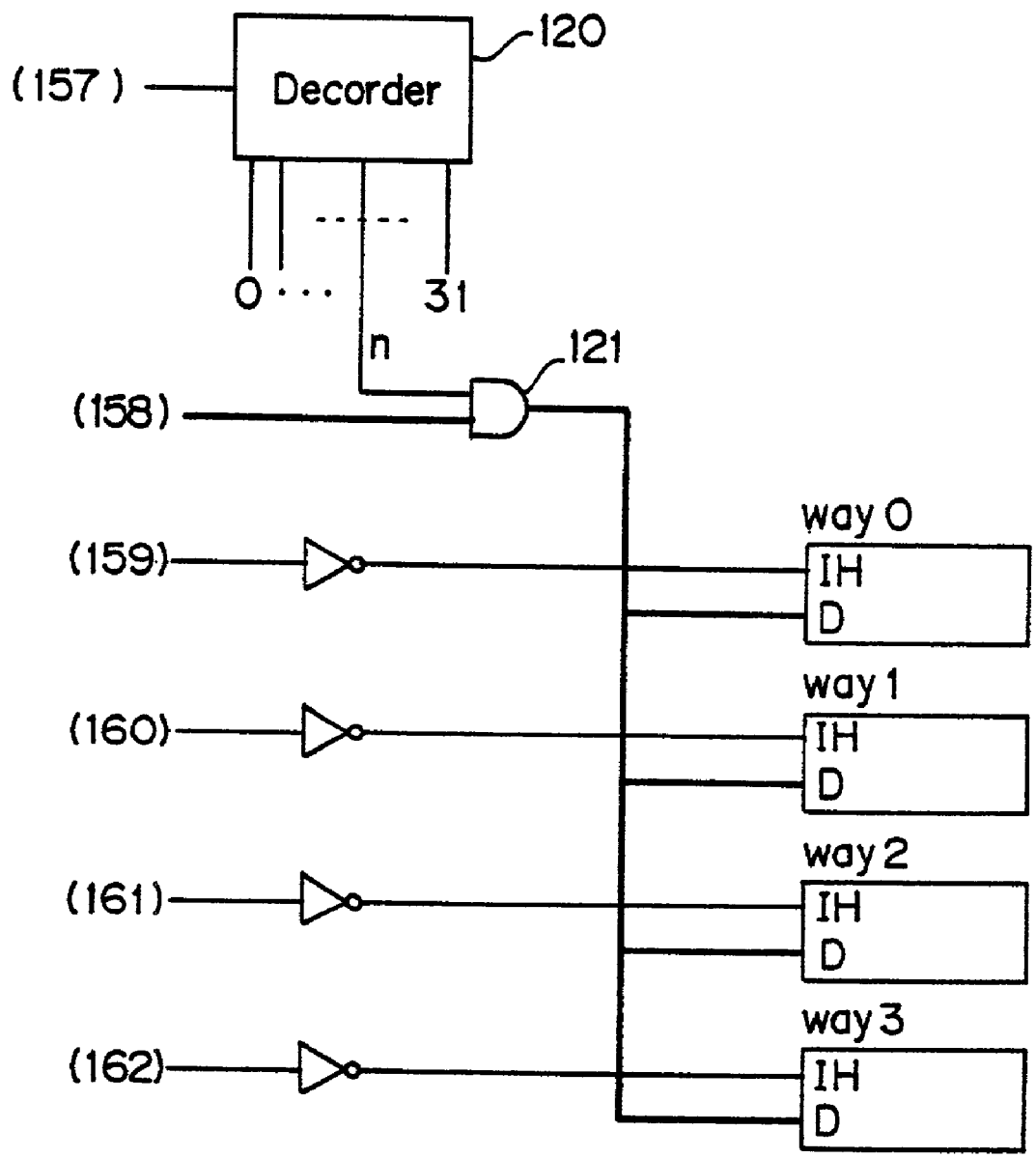
FIG. 23 shows one example configuration of an absolute address history table data writing unit.

If the circuits described above select a way, each piece of data is written in the selected way, as shown in FIG. 23.

FIG. 23 shows an example configuration of an absolute address history table data writing unit.

AAHT_LINE<0:4> (LOGICAL_ADRS<15:19>, which is the output shown in FIG. 21 is inputted to a decoder 120 and a signal instructing to which line of the 32 lines the output should be written is outputted. FIG. 21 shows the configuration of only one line of the 32 lines. The signal from the decoder 120 is inputted to a device 121 (although this is described as an AND circuit, it functions as either a selector or a gate), and SET_LASTACC_FLAG, ABSOLUTE_ADRS, LOGICAL_ADRS_TAG and VALID (=1, a valid signal) are selected/outputted. Then, these pieces of data are inputted to the line #n of the AAHT composed of latches. To the AAHT, a write-valid signal (+WEAYx_WRITE_VAL) from FIG. 21 is inputted. In the AAHT of only away in which a write-valid signal becomes "1", a signal to be inputted to an IH terminal becomes "0". Therefore, inputted data are stored.

Figure 24:
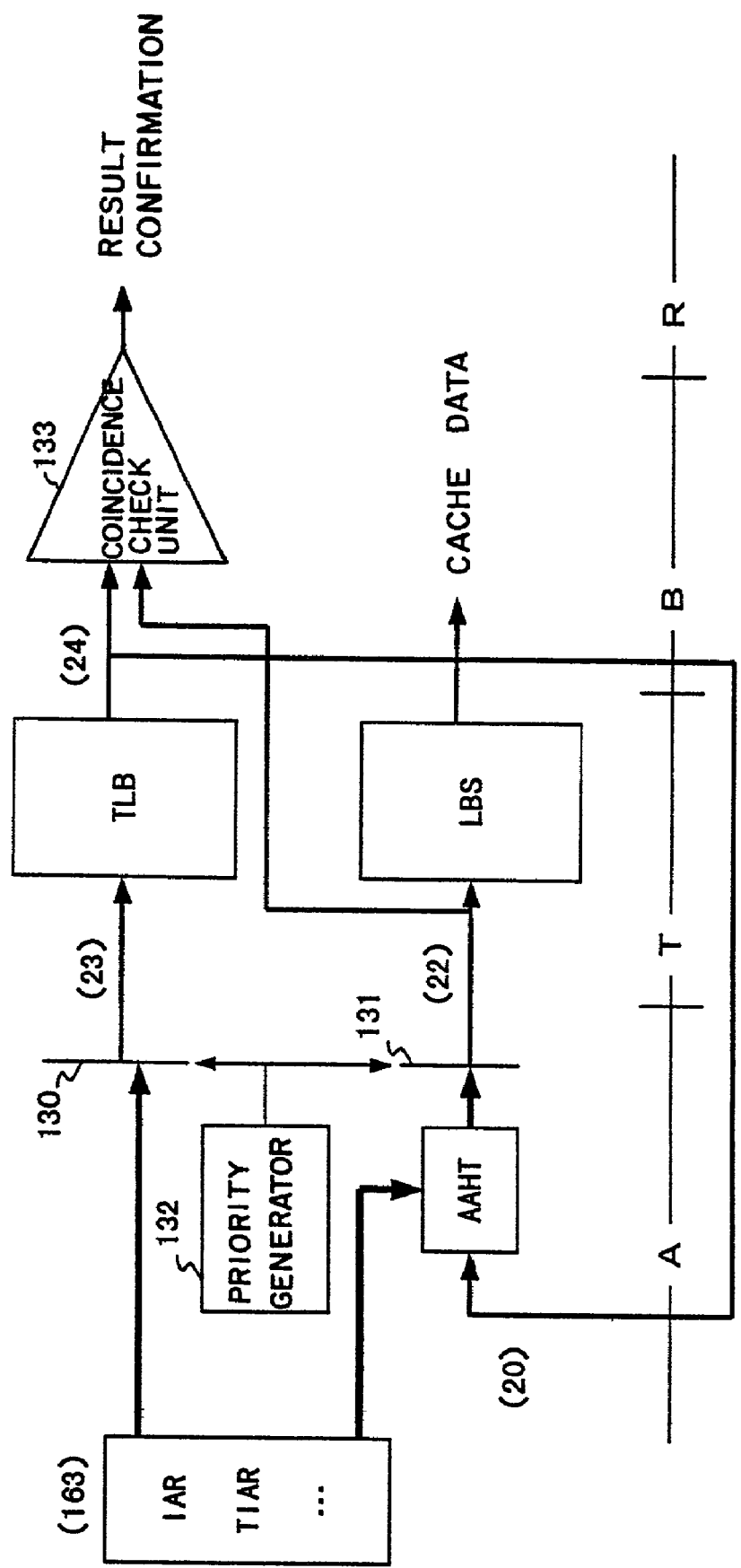
FIG. 24 shows the entire configuration of the preferred embodiment of the present invention in the case of an instruction fetch.

FIG. 24 shows the entire configuration of the preferred embodiment of the present invention in the case of an instruction fetch.

In the case of an instruction fetch, there is no need for a process as in the case of an operand operation. Therefore, an instruction address IAR, a branch destination instruction address TIAR and the like that are needed for a fetch are inputted, the IAR and TIAR of which are logical addresses, are inputted to a selector 130. In order to access a cache LBS based on an absolute address, these logical addresses are inputted to the absolute address history table AAHT, are translated into a predicted absolute address and are inputted to a selector 131. The output priority of the logical/absolute addresses inputted to the selectors 130 and 131 are determined by a priority generator 132, and are outputted from the selectors 130 and 131, respectively. The logical address outputted from the selector 130 is inputted to a TLB, is translated into an absolute address and is inputted to a coincidence check unit 133.

After being outputted from the selector 131, the absolute address predicted by the AAHT is inputted to an LBS and is used for cache access. Simultaneously, the absolute address is inputted to the coincidence check unit 133, is compared with the correct absolute address obtained by the TLB and is used for result confirmation.

FIG. 25 shows the configuration of the preferred embodiment of an instruction fetch unit.

In FIG. 25, each of IAR_A, IAR_B and IAR_C stores the subsequent address of each instruction fetch port (the subsequent address in an instruction string that already issued an instruction fetch request). Since each of TIAR_A, TIAR_B and TIAR_C exists in the instruction string of each fetch instruction port, each of TIAR_A, TIAR_B and TIAR_C stores a branch destination address in the case where it is predicted that a branch instruction will branch. In particular, BRHIS_TIAR indicates a branch destination address obtained by the latest branch prediction (bypass from a branch prediction mechanism). IARX stores an interruption return address, a start address and the like. In particular, RSBR_TOQ_TIAR is a branch destination address of a branch instruction in a branch processing mechanism and becomes valid in the bypass of re-instruction fetch. These addresses are simply examples, and generally speaking, the present invention is not limited to such a configuration.

This preferred embodiment uses a direct-map absolute address history table for the purpose of simplifying the description. Any person having ordinary skill in the art can easily understand the set associative method, which is described with reference to the operand access unit, or a full associative method can also be used.

In FIG. 25, a logical address <1:31> inputted from an address source 135 is inputted to a selector 136, is selected according to the instruction of a priority generator 139 and is outputted as an instruction fetch logical address IF_LOGICAL_ADRS<1:31>.

The bit<15:19> of the logical address from each address source 135 is inputted to the line selector 138 of the AAHT and the selected absolute address<16:19> is inputted to a selector 137. Like the selector 136, the selector 137 is controlled by the priority generator 139 and the signal is outputted as an instruction fetch absolute address IF_ABS_ADRS<16:19> in a prescribed priority. Since the configuration of the priority generator 139 is publicly known, the detailed description is omitted.

As shown in FIG. 25, if the priority generator is greatly delayed, the absolute address (together with the logical address) is selected based on the output of the priority generator after an absolute address is selected by each request address.

Figure 26:
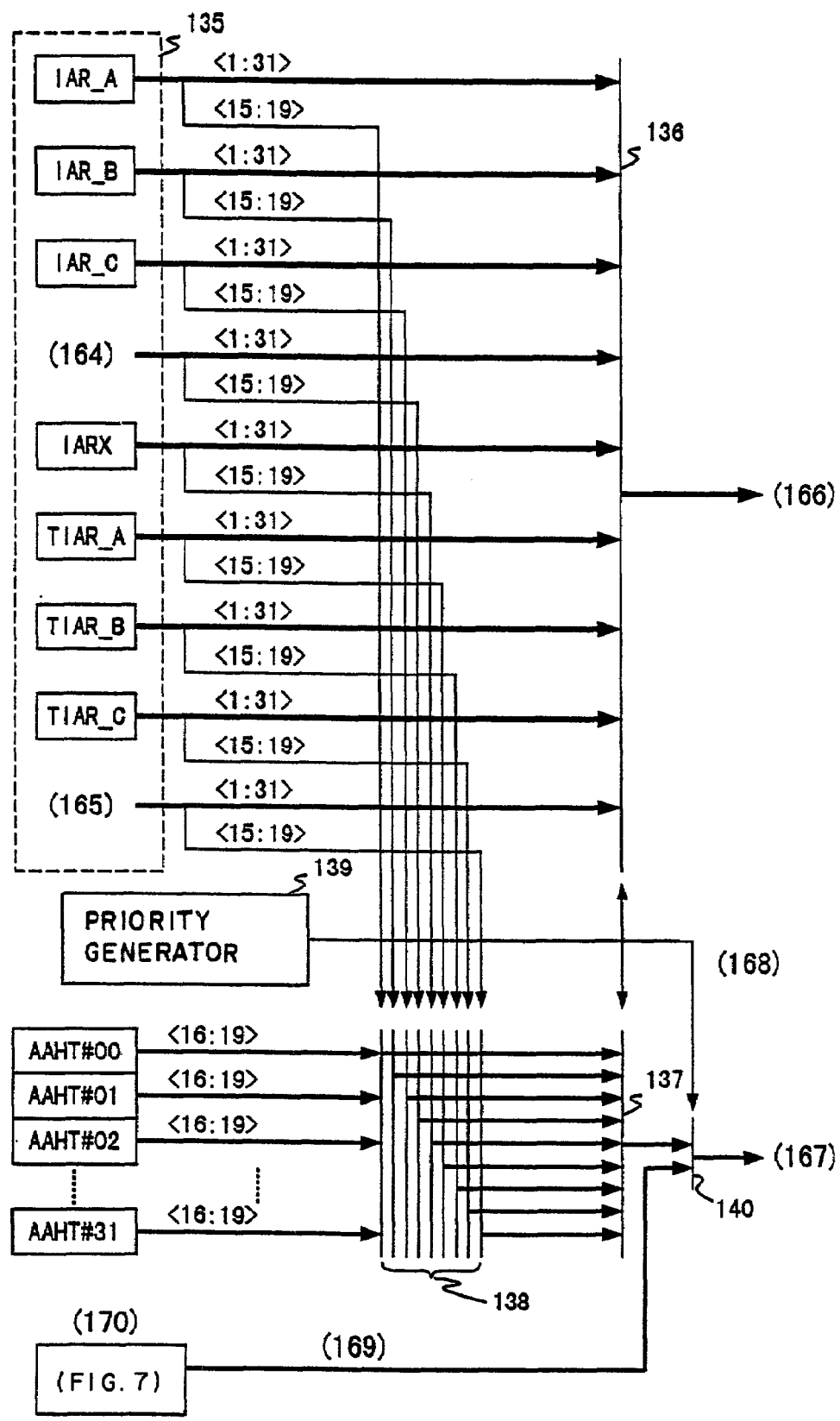
FIG. 26 shows the configuration of the preferred embodiment in the case where a configuration for using a branch destination address for the purpose of operand access is incorporated into the configuration shown in FIG. 25.

Since the branch destination address is generated based on a base register value, an index register value and a deviation value like the address of an operand access, an absolute address can be predicted as in the address in the case of operand access. FIG. 26 shows an example configuration of this case.

In FIG. 26, the same codes are attached to the same constituent components as those shown in FIG. 25, and the detailed descriptions are omitted.

The logical address from the address source 135 is outputted as IF_LOGICAL ADRS<1:31> according to the instructions of the priority generator 139 from the selector 136. The predicted absolute address is selected from the AAHT by a line selector 138, is outputted from the selector 137 under the control of the priority generator 139 and is inputted to a selector 140. To the selector 140, the predicted absolute address of the branch destination instruction address RSBRTIAR_ABS_ADRS<16:19> inputted from the circuit described with reference to FIG. 7 is inputted. Then, the predicted absolute address is selected/outputted as a signal IF_ABS_ADRS<16:19> from the selector 140 according to the instruction of the priority generator 139.

Since the writing of the signal in an absolute address history table is basically the same as that of the operand access unit, the description is omitted.

In the case of operand access, according to the simulation result, a prediction failure rate in the case where a logical address is calculated and an absolute address history table is retrieved using the logical address is approximately 1%, while the prediction failure rate of this preferred embodiment is approximately 2%. In the case where a logical address is calculated and a table is retrieved using the logical address, one extra clock is always (even in the case of a cache hit) required, compared with the retrieval method of the preferred embodiment. In the case of a pipeline method, it goes without saying that this clock difference directly influences the CPI (Clock Per Instruction). Even in the case of an out-of-order method, this clock difference directly influences the CPI (Clock Per Instruction). However, the difference in loss due to the increased prediction failure rate in the generation of prediction failures between them is only 1%. Even if the time delay of the prediction failure due to this difference takes an extra six clocks, compared with the case where a logical address is calculated and a table is retrieved using the logical address, the loss that influences the CPI is at most 6×0.01=0.06. The difference between the present invention and the case where a logical address is calculated and a table is retrieved using the logical address is clear.

In the case of instruction fetch, there is no need to increase the number of clocks, as shown in FIG. 2, if the method of this preferred embodiment is adopted, as long as the content of an absolute address history is correct (a method for retrieving data after selecting a logical address always takes one extra clock). Therefore, the method of the present invention contributes to the improvement of the function. According to the simulation result, a higher-accuracy prediction is possible with a fewer number of tables than that of the operand access, and the difference in the CPI between the present invention and a cache system based on a logical address is negligible.

Since there is no synonym problem in this system, compared with this preferred embodiment, the effect of the present invention is also great in this respect.

The present invention can implement high-speed memory access in a device requiring high-speed operation, such as an information processing device adopting a superscalar method and the like. The information processing device is applicable to a large-scale data process problem, such as weather forecast and the like, by improving the process speed of the information processing device.

Explanation of the Codes in the Drawings
(1) Generates a logical address to be fetched.
(2) Calculates an absolute address by retrieving data from the TLB.
(3) Reads an LBS tag.
(4) Reads LBS data.
(5) Exception check and the like
(6) Way selection
(7) Buffer setting
(8) Result confirmation
(9) (For the second cache access)
(10) Predicts an absolute address.
(11) Coincidence check of absolute addresses
(12) Writes back correct address correspondence in the AAHT.
(13) Coincidence check of logical addresses
(14) Calculates an absolute address by retrieving data from the AAHT.
(15) ABS_ADRS<16:19>
(16) LOGICAL_ADRS<20:25>
(17) LOGICAL_ADRS<12:19>
(18) Address calculation original data
(19) Operand access unit
(20) Writes back correct logical address/absolute address correspondence
(21) Predicted logical address
(22) Predicted absolute address
(23) Correctly calculated logical address
(24) Corresponding absolute address
(25) Cache based on an absolute address
(26) BYPASS_BR<1:31>
(27) BYPASS_XR<1:31>
(28) Carry-Prediction
(29) Select-Circuit
(30) BR_x_NUM<0:3>
(31) XR_x_NUM<0:3>
(32) EAG_x_LOGICAL ADRS<1:31>
(33) EAG_x_ABS ADRS<16:19>
(34) Absolute Address History Table (AAHT)
(35) +BR_x_NUM<0:3>
(36) +BR_x_DATA<1:19>
(37) +XR_x_NUM<0:3>
(38) +XR_x_DATA<1:19>
(39) +BR+XR_x_LARGE
(40) +BR_x_NUM<0:3>
(41) +BR_x_DATA<20>
(42) +BR_x_DATA<21>
(43) +XR_x_NUM<0:3>
(44) +XR_x_DATA<20>
(45) +XR_x_DATA<21>
(46) +BR_x_CARRY_PREDICT
(47) +XR_x_CARRY_PREDICT
(48) BR_x_NUM<0:3>
(49) XR_x_NUM<0:3>
(50) CARRY_REG#0
(51) CARRY_REG_0_NUM<0:3>
(52) CARRY_REG_0_BYTE<20:31>
(53) CARRY_REG#1
(54) CARRY_REG_1_BYTE<20:31>
(55) CARRY_REG_1_NUM<0:3>
(56) +BR_x_REG_CARRY_PREDICT
(57) +XR_x_REG_CARRY_PREDICT
(58) +EAG_0_PAGE_CROSS
(59) +BR+XR_0_LARGE
(60) +EAG 1 PAGE_CROSS
(61) +BR+XR_1_LARGE
(62) +BR_0_NUM<0:3>
(63) +XR_0_NUM<0:3>
(64) +CARRY_REG_0_NUM<0:3>
(65) +CARY_REG_1_NUM<0:3>
(66) +REPLACE_FLAG
(67) +BR_1_NUM<0:3>
(68) +XR_1_NUM<0:3>
(69) +CARRY_REG_1_NUM<0:3>
(70) +CARRY_REG_0_NUM<0:3>
(71) +REPLACE_FLAG
(72) REPLACE_FLAG
(73) +REPLACE_FLAG
(74) +EAG_0_PAGE_CARRY
(75) +BR_0_DATA<20:31>
(76) +XR_0_DATA<20:31>
(77) +EAG_1_PAGE_CARRY
(78) +BR_1_DATA<20:31>

(79) +XR_1_DATA<20:31>
(80) CARRY_REG#0
(81) CARRY_REG#1
(82) +CARRY_REG_0_NUM<0:3>
(83) +CARRY_REG_0_BYTE<20:31>
(84) +CARRY_REG_1_NUM<0:3>
(85) +CARRY_REG_1_BYTE<20:31>
(86) +BR_x_DATA<8:19>
(87) +BR_x_CARRY_PREDICT
(88) +XR_x_DATA<8:19>
(89) +XR_x_CARRY_PREDICT
(90) +PREDICT_LAR_x<8:19>
(91) +PREDICT_VALID_x
(92) 32line. 4way
(93) PREDICT_LAR_x<8:19>
(94) LOGICAL_ADRS_TAG
(95) ABSOLUTE_ADRS<16:19>
(96) EAG_x_ABS_ADRS<16:19>
(97) −BR+XR_x_LARGE
(98) BR_x_NUM<0:3>
(99) XR_x_NUM<0:3>
(100) +EAG_x_LOGICAL_ADRS<8:13>
(101) +LARGE_BR_x_NUM<0:3>
(102) +LARGE_XR_x_NUM<0:3>
(103) +LARGE_LAR_x<8:19>
(104) +TLB_x_ABS_ADRS<8:19>
(105) +LARGE_ABS_ADRS_x<8:19>
(106) +BR_x_NUM<0:3>
(107) +LARGE_BR_0_NUM<0:3>
(108) +XR_x_NUM<0:3>
(109) +LARGE_XR_0_NUM<0:3>
(110) +BR+XR_x_LARGE
(111) +BR_x_NUM<0:3>
(112) +LARGE_BR_1_NUM<0:3>
(113) +XR_x_NUM<0:3>
(114) +LARGE_XR_1_NUM<0:3>
(115) +USE_x_REG_PAIR_HISTORY_0
(116) +USE_x_REG_PAIR_HISTORY_1
(117) +LARGE_ABS_ADRS_0<8:19>
(118) +USE_x_REG_PAIR_HISTORY_0
(119) +LARGE_ABS_ADRS_1<8:19>
(120) +USE_x_REG_PAIR_HISTORY_1
(121) +PREDICT_ABS_x_PAIR<8:19>
(122) +LARGE_LAR_0<8:19>
(123) +USE_x_REG_PAIR_HISTORY_0
(124) +LARGE_LAR_1<8:19>
(125) +USE_x_REG_PAIR_HISTORY_1
(126) +PREDICT_LAR_x_PAIR<8:19>
(127) Absolute address obtained by TLB retrieval
(128) Determines an absolute address.
(129) Writes back correct address correspondence in the AAHT (If both BX and XR are large, suppress the write back)
(130) A failure is determined to have occurred.
(131) Secures the priority of cache retrieval in which an absolute address is determined, etc.
(132) S-Unit (TLB)
(133) ABSOLUTE_ADRS<16:19>
(134) LOGICAL_ADRS<8:19>
(135) AAHT (32line/4way)
(136) LogicalAddressTag
Valid_Flag
LastAccessFlag
(137) Valid
LastAccess
(138) SET_LASTACC_FLAG
(139) AAHT_LINE<0:4>
(140) ABSOLUTE_ADRS<16:19>
LOGICAL_ADRS_TAG<8:14>
(141) WAY0_WRITE_VAL
(142) WAY1_WRITE_VAL
(143) WAY2_WRITE_VAL
(144) WAY3_WRITE_VAL
(145) Way selector
(146) +WAY0_LASTACC_FLAG
(147) +WAY1_LASTACC_FLAG
(148) +WAY2_LASTACC_FLAG
(149) +WAY3_LASTACC_FLAG
(150) Replace-way selector
(151) EXIST_INVALID
(152) +WAY0_WR_SEL_NO_MATCH
(153) +WAY1_WR_SEL_NO_MATCH
(154) +WAY2_WR_SET_NO_MATCH
(155) +WAY3_WR_SEL_NO_MATCH
(156) +SET_LASTACC_FLAG
(157) AAHT_LINE<0:4>(=LOGICAL_ADRS<15:19>)
(158) SET_LASTACC_FLAG
ABSOLUTE_ADRS
LOGICAL_ADRS_TAG
VALID (=1)
(159) +WAY0_WRITE_VAL
(160) +WAY1_WRITE_VAL
(161) +WAY2_WRITE_VAL
(162) +WAY3_WRITE_VAL
(163) Address calculation original data group
(164) RSBR_TOQ_TIAR (Bypass)
(165) BRHIS_TIAR (Bypass)
(166) 1F_LOGICAL_ADRS<1:31>
(167) 1F_ABS_ADRS<16:19>
(168) RSBR_TOQ_SELECT
(169) RSBR_TIAR_ABS_ADRS<16:19>
(170) OP_EAG(for RSBR_TOQ_TIAR) unit

What is claimed is:

1. A device comprising
an address history table storing in a pair at least a partial bit string of a logical address and bits of an absolute address corresponding to the partial bit string of the logical address that are needed as a retrieval key of a memory based on an absolute address;
a retrieval unit retrieving data from a register file in the case of memory access, reading a value corresponding to a register number of the register file and retrieving data from the address history table using the value as the logical address and using a partial aggregate of the logical address;
a memory access unit accessing a memory using a predicted absolute address obtained by retrieving data from the address history table;
a Translation-Lookaside Buffer (TLB) obtaining the correct absolute address using the logical address;
a memory access result confirmation unit checking for coincidence between the predicted absolute address and the correct absolute address and confirming a result of memory access made using the predicted absolute address; and
a prediction unit judging whether carry crossing pages is caused from a register value as a result of the addition in a case where a value obtained by adding a displacement value to the register file value in memory access is designated as a memory access value.

2. A device according to claim 1 wherein if the predicted absolute address does not coincide with the correct absolute address as a result of the coincidence check, a memory is accessed again using the obtained absolute address.

3. A device, comprising:
an address history table storing in a pair at least a partial bit string of a logical address and bits of an absolute address corresponding to the partial bit string of the logical address that are needed as a retrieval key of a memory based on an absolute address;
a retrieval unit retrieving data from a register file in the case of memory access, reading a value corresponding to a register number of the register file and retrieving data from the address history table using the value as the logical address and using a partial aggregate of the logical address;
a memory access unit accessing a memory using a predicted absolute address obtained by retrieving data from the address history table;
a Translation-Lookaside Buffer (TLB) obtaining the correct absolute address using the logical address;
a memory access result confirmation unit checking for coincidence between the predicted absolute address and the correct absolute address and confirming a result of memory access made using the predicted absolute address;
a prediction unit judging whether carry crossing pages is caused from a register value as a result of the addition in a case where a value obtained by adding a displacement value to the register file value in memory access is designated as a memory access value; and
a memory unit storing one or more register numbers of register files in each of which carry is caused when adding the displacement value to the register value in the previous carry prediction.

4. The device according to claim 3, wherein if the predicted absolute address does not coincide with the correct absolute address as a result of the coincidence check, a correct pair of the logical address and the absolute address is registered again in the address history table.

5. A device, comprising:
an address history table storing in a pair at least a partial bit string of a logical address and bits of an absolute address corresponding to the partial bit string of the logical address that are needed as a retrieval key of a memory based on an absolute address;
a retrieval unit retrieving data from a register file in the case of memory access, reading a value corresponding to a register number of the register file and retrieving data from the address history table using the value as the logical address and using a partial aggregate of the logical address;
a memory access unit accessing a memory using a predicted absolute address obtained by retrieving data from the address history table;
a Translation-Lookaside Buffer (TLB) obtaining the correct absolute address using the logical address; and
a memory access result confirmation unit checking for coincidence between the predicted absolute address and the correct absolute address and confirming a result of memory access made using the predicted absolute address;
wherein in a case where a value obtained by adding a plurality of register values is designated as a memory access address and no more than one register value is determined as valid, said address history table is retrieved by selecting one of the plurality of register values if neither of the plurality of register values is invalid.

6. A device comprising:
an address history table storing in a pair at least a partial bit string of a logical address and bits of an absolute address corresponding to the partial bit string of the logical address that are needed as a retrieval key of a memory based on an absolute address;
a retrieval unit retrieving data from a register file in the case of memory access, reading a value corresponding to a register number of the register file and retrieving data from the address history table using the value as the logical address and using a partial aggregate of the logical address;
a memory access unit accessing a memory using a predicted absolute address obtained by retrieving data from the address history table;
a Translation-Lookaside Buffer (TLB) obtaining the correct absolute address using the logical address; a memory access result confirmation unit checking for coincidence between the predicted absolute address and the correct absolute address and confirming a result of memory access made using the predicted absolute address,
wherein in a case where a value obtained by adding a plurality of register values is designated as a memory access address, registration to said address history table of a translation result from a logical address to the absolute address is suppressed if none of the plurality of register values is invalid.

7. A device, comprising:
an address history table storing in a pair at least a partial bit string of a logical address and bits of an absolute address corresponding to the partial bit string of the logical address that are needed as a retrieval key of a memory based on an absolute address;
a retrieval unit retrieving data from a register file in the case of memory access, reading a value corresponding to a register number of the register file and retrieving data from the address history table using the value as the logical address and using a partial aggregate of the logical address;
a memory access unit accessing a memory using a predicted absolute address obtained by retrieving data from the address history table;
a Translation-Lookaside Buffer (TLB) obtaining the correct absolute address using the logical address;
a memory access result confirmation unit checking for coincidence between the predicted absolute address and the correct absolute address and confirming a result of memory access made using the predicted absolute address; and
a second address history table storing both a register number pair of the register and the absolute address corresponding to the register number pair that is obtained as a result of address translation in a case where a value obtained by adding a plurality of register values is designated as a memory access address if none of the plurality of register values is invalid.

8. A device, comprising:
an address history table storing in a pair at least a partial bit string of a logical address and bits of an absolute address corresponding to the partial bit string of the logical address that are needed as a retrieval key of a memory based on an absolute address;
a retrieval unit retrieving data from a register file in the case of memory access, reading a value corresponding to a register number of the register file and retrieving data from the address history table using the value as the logical address and using a partial aggregate of the logical address;

a memory access unit accessing a memory using a predicted absolute address obtained by retrieving data from the address history table;

a Translation-Lookaside Buffer (TLB) obtaining the correct absolute address using the logical address;

a memory access result confirmation unit checking for coincidence between the predicted absolute address and the correct absolute address and confirming a result of memory access made using the predicted absolute address; and a third address history table storing both a register number pair of the register and the logical address that is obtained by adding register values corresponding to the register number pair in a case where a value obtained by adding a plurality of register values is designated as a memory access address if none of the plurality of register values is invalid, wherein the third address history table retrieves data from said history table using the logical address.

9. A device, comprising:

an address history table storing in a pair at least a partial bit string of a logical address and bits of an absolute address corresponding to the partial bit string of the logical address that are needed as a retrieval key of a memory based on an absolute address;

a retrieval unit retrieving data from a register file in the case of memory access, reading a value corresponding to a register number of the register file and retrieving data from the address history table using the value as the logical address and using a partial aggregate of the logical address;

a memory access unit accessing a memory using a predicted absolute address obtained by retrieving data from the address history table;

a Translation-Lookaside Buffer (TLB) obtaining the correct absolute address using the logical address;

a memory access result confirmation unit checking for coincidence between the predicted absolute address and the correct absolute address and confirming a result of memory access made using the predicted absolute address; and a retrieval unit retrieving data from the address history table in advance for each of one or more pieces of instruction fetch that might be requested;

a priority generator selecting an instruction fetch address to be used for memory access; and a memory access unit accessing a memory using an absolute address corresponding to the instruction fetch address selected by the priority generator.

10. A method, comprising:

storing in a pair at least a partial bit string of a logical address and bits of an absolute address corresponding to the partial bit string of the logical address that are needed as a retrieval key of a memory based on an absolute address;

retrieving data from a register file in the case of memory access, reading a value corresponding to a register number of the register file and retrieving data from the memory content stored using the value as a logical address and using a partial aggregate of the logical address;

accessing a memory using a predicted absolute address that is obtained in the retrieving data;

obtaining a correct absolute address using the logical address; and checking for coincidence between the predicted absolute address and the correct absolute address and confirming a result of memory access executed using the predicted absolute address;

retrieving data from the memory content stored in advance for each of one or more pieces of instruction fetch that might be requested;

selecting an instruction fetch address to be used for memory access; and accessing the memory using the absolute address corresponding to the instruction fetch address selected in the selection step.

11. A computer-readable storage storing a computer-readable program that controls a device to access a memory, by a method comprising:

storing in a pair at least a partial bit string of a logical address and bits of an absolute address corresponding to the partial bit string of the logical address that are needed as a retrieval key of a memory based on an absolute address;

retrieving data from a register file in the case of memory access;

reading a value corresponding to a register number of the register file and retrieving data from the stored memory content using the value as a logical address and using a partial aggregate of the logical address;

accessing a memory using a predicted absolute address that is obtained in the retrieving data;

obtaining a correct absolute address using the logical address; and checking for coincidence between the predicted absolute address and the correct absolute address and confirming a result of memory access executed using the predicted absolute address.

12. A computer-readable storage storing a computer-readable program that controls a device to access a memory, by a method comprising:

storing in a pair at least a partial bit string of a logical address and bits of an absolute address corresponding to the partial bit string of the logical address that are needed as a retrieval key of a memory based on an absolute address;

retrieving data from a register file in the case of memory access;

reading a value corresponding to a register number of the register file and retrieving data from the stored memory content using the value as a logical address and using a partial aggregate of the logical address;

accessing a memory using a predicted absolute address that is obtained in the retrieving data;

obtaining a correct absolute address using the logical address;

checking for coincidence between the predicted absolute address and the correct absolute address and confirming a result of memory access executed using the predicted absolute address;

retrieving data from the stored memory content stored in advance for each of one or more pieces of instruction fetch that might be requested;

selecting an instruction fetch address to be used for memory access; and accessing the memory using the absolute address corresponding to the instruction fetch address selected.

13. A method of accessing a cache, comprising:
generating a logical address to be fetched;
predicting an absolute address used to access the cache;
reading a local buffer store (LBS) tag and LBS data using the predicted absolute address;
calculating a real absolute address by retrieving data from a translation-lookaside buffer using the generated logical address; and
conducting one of an exception check, a way selection, or a setting of the LBS data in a buffer depending upon the read results of the LBS tag and LBS data,
wherein the predicting is either a predicting based on a priority generator selecting an instruction fetch address to be used for memory access and accessing a memory using an absolute address corresponding to the instruction fetch address selected by the priority generator or a predicting based on a carry or addition result.

14. The method according to claim 13, further comprising:
comparing the calculated real absolute address and the predicted absolute address; and
confirming a result or writing back in an absolute address history table a correct address based on the comparison.

15. The method according to claim 13, wherein the predicting the absolute address is performed substantially simultaneously with the generating the logical address to be fetched.

16. A method of memory access, comprising:
inputting a plurality of register values to an access unit and to a logical access predicting unit;
calculating a logical address using the inputted register values;
predicting a predicted logical address using the inputted register values;
generating a predicted absolute address based upon the predicted logical address using an address history table; and
inputting the generated predicted absolute address to a local buffer store.

17. The method according to claim 16, wherein each entry of the address history table is a absolute address bit to be paired with a logical address.

18. A method of memory access, comprising:
inputting a plurality of register values to an access unit and to a logical access predicting unit;
calculating a logical address using the inputted register values;
predicting a predicted logical address using the inputted register values;
generating a predicted absolute address based upon the predicted logical address using an address history table;
inputting the generated predicted absolute address to a local buffer store; and
adding only respective two-higher order bits in a byte index section of base register data and index register data to carry predict.

* * * * *